(12) United States Patent
Yamada

(10) Patent No.: US 11,662,956 B2
(45) Date of Patent: May 30, 2023

(54) PRINTING SYSTEM, SERVER, AND PRINT CONTROL APPARATUS FOR ISSUING A PRINT COMMAND FOR PROCESSING A PRINT COMMAND ORIGINATING AT A TERMINAL APPARATUS

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/447,215

(22) Filed: Sep. 9, 2021

(65) Prior Publication Data

US 2022/0083285 A1    Mar. 17, 2022

(30) Foreign Application Priority Data

Sep. 11, 2020    (JP) .............................. JP2020-152578

(51) Int. Cl.
*G06F 3/12*    (2006.01)

(52) U.S. Cl.
CPC .......... *G06F 3/1203* (2013.01); *G06F 3/1237* (2013.01); *G06F 3/1287* (2013.01)

(58) Field of Classification Search
CPC .... G06F 3/1203; G06F 3/1237; G06F 3/1287; G06F 3/1292; G06F 3/1293; G06F 3/1285

USPC ......................................................... 358/1.15
See application file for complete search history.

(56) References Cited

U.S. PATENT DOCUMENTS

| | | | | |
|---|---|---|---|---|
| 6,115,132 A | * | 9/2000 | Nakatsuma | ........... G06F 3/1213 358/1.14 |
| 2006/0114494 A1 | * | 6/2006 | Crosby | ................ G06F 3/1207 358/1.15 |
| 2013/0021638 A1 | * | 1/2013 | Hong | .................... G06F 3/1204 358/1.14 |
| 2020/0167112 A1 | | 5/2020 | Oshima et al. | |

FOREIGN PATENT DOCUMENTS

| | | |
|---|---|---|
| JP | 2004-246472 A | 9/2004 |
| JP | 2020-082468 A | 6/2020 |

* cited by examiner

*Primary Examiner* — Jamares Q Washington
(74) *Attorney, Agent, or Firm* — Workman Nydegger

(57) ABSTRACT

In a printing system, a smartphone reads a printer ID and transmits a smartphone's print command that includes the read printer ID and a user ID to a server; the server transmits a server's print command that includes the printer ID included in the received smartphone's print command to an office PC associated with the user ID included in the received smartphone's print command; the office PC creates print data based on the print job received from the server, according to the received server's print command; and a printer performs printing according to the received print data.

15 Claims, 14 Drawing Sheets

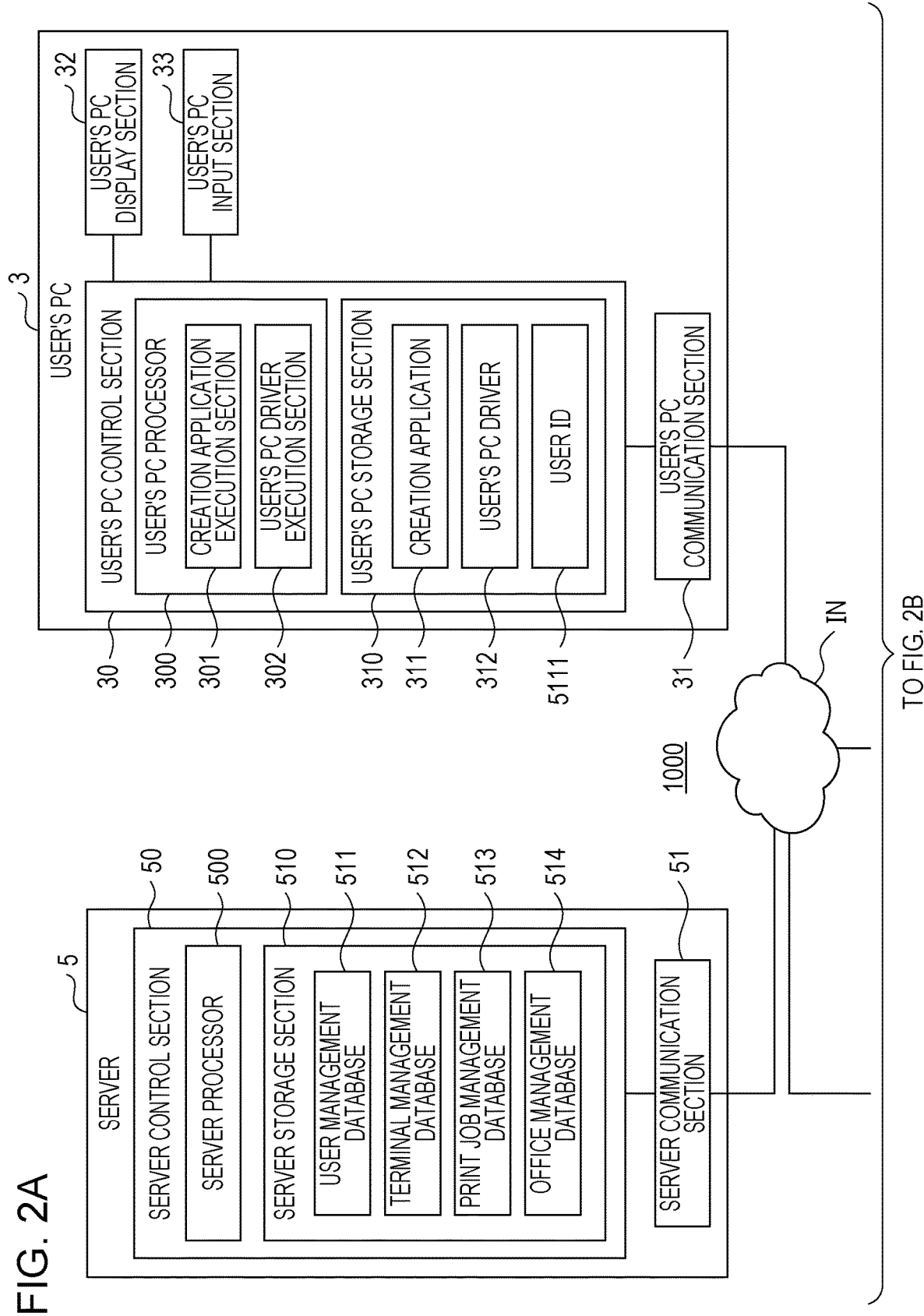

PRINTING SYSTEM, SERVER, AND PRINT CONTROL APPARATUS FOR ISSUING A PRINT COMMAND FOR PROCESSING A PRINT COMMAND ORIGINATING AT A TERMINAL APPARATUS

The present application is based on, and claims priority from JP Application Serial Number 2020-152578, filed Sep. 11, 2020, the disclosure of which is hereby incorporated by reference herein in its entirety.

BACKGROUND

1. Technical Field

The present disclosure relates to a printing system, a server, and a print control apparatus.

2. Related Art

In a technology known in related art, a server transmits print data to a printing apparatus through the Internet. For example, in a system disclosed in JP-A-2004-246472, which has a document processing subsystem and a document output apparatus coupled to the document processing subsystem through the Internet, the document processing subsystem transmits output data to the document output apparatus.

With the technology disclosed in JP-A-2004-246472, however, when the document output apparatus cannot be coupled to the Internet or when the document processing subsystem cannot transmit output data matching the command system in the document output apparatus, the document output apparatus cannot construct a system.

SUMMARY

An aspect of the present disclosure that solves the above problem is a printing system that has: a printing apparatus; a print control apparatus coupled to the printing apparatus, the print control apparatus having a printer driver that creates print data and transmitting an output to a printing apparatus; a server coupled to the print control apparatus through the Internet; and a terminal apparatus coupled to the server through the Internet, the terminal having a reading section and a storage section storing first identification information. A medium on which second identification information that identifies the printing apparatus is recorded is attached to the printing apparatus. The terminal apparatus causes the reading section to read the second identification information recorded on the medium, and transmits, to the server, a first print command that includes the read second identification information and the first identification information stored in the storage section. The server stores a print job in correlation to the first identification information, transmits the print job to the print control apparatus, receives the first print command, and transmits, to the print control apparatus, a second print command that includes the second identification information according to the received first print command, the second print command commanding printing based on the print job. Upon receipt of the second print command, the print control apparatus causes the printer driver to create the print data based on the print job, after which the print control apparatus transmits the created print data to the printing apparatus corresponding to the second identification information included in the received second print command. The printing apparatus performs printing according to the received print data.

Another aspect of the present disclosure that solves the above problem is a server coupled through the Internet to a terminal apparatus and to a print control apparatus coupled to a printing apparatus, the print control apparatus having a printer driver matching the printing apparatus. The server has a server control section and a server storage section that stores a print job associated with first identification information and also stores management information in which the print control apparatus and second identification information that identifies the printing apparatus are mutually associated. The server control section transmits the print job to the print control apparatus, receives, from the terminal apparatus, a first print command that includes the first identification information and the second identification information, and upon receipt of the first print command, transmits, to the print control apparatus associated with the second identification information, a second print command that includes the second identification information, the second print command commanding printing based on the print job.

Yet another aspect of the present disclosure that solves the above problem is a print control apparatus coupled to a printing apparatus and also coupled to a server through the Internet. The print control apparatus has a print control apparatus control section that receives a print job from the server, operates a printer driver to create print data according to the print job, and upon receipt of a second print command that includes second identification information that identifies the printing apparatus, transmits the created print data to the printing apparatus.

BRIEF DESCRIPTION OF THE DRAWINGS

FIGS. 2A and 2B illustrate the structures of apparatuses included in the printing system.

DESCRIPTION OF EXEMPLARY EMBODIMENTS

Figure 1:
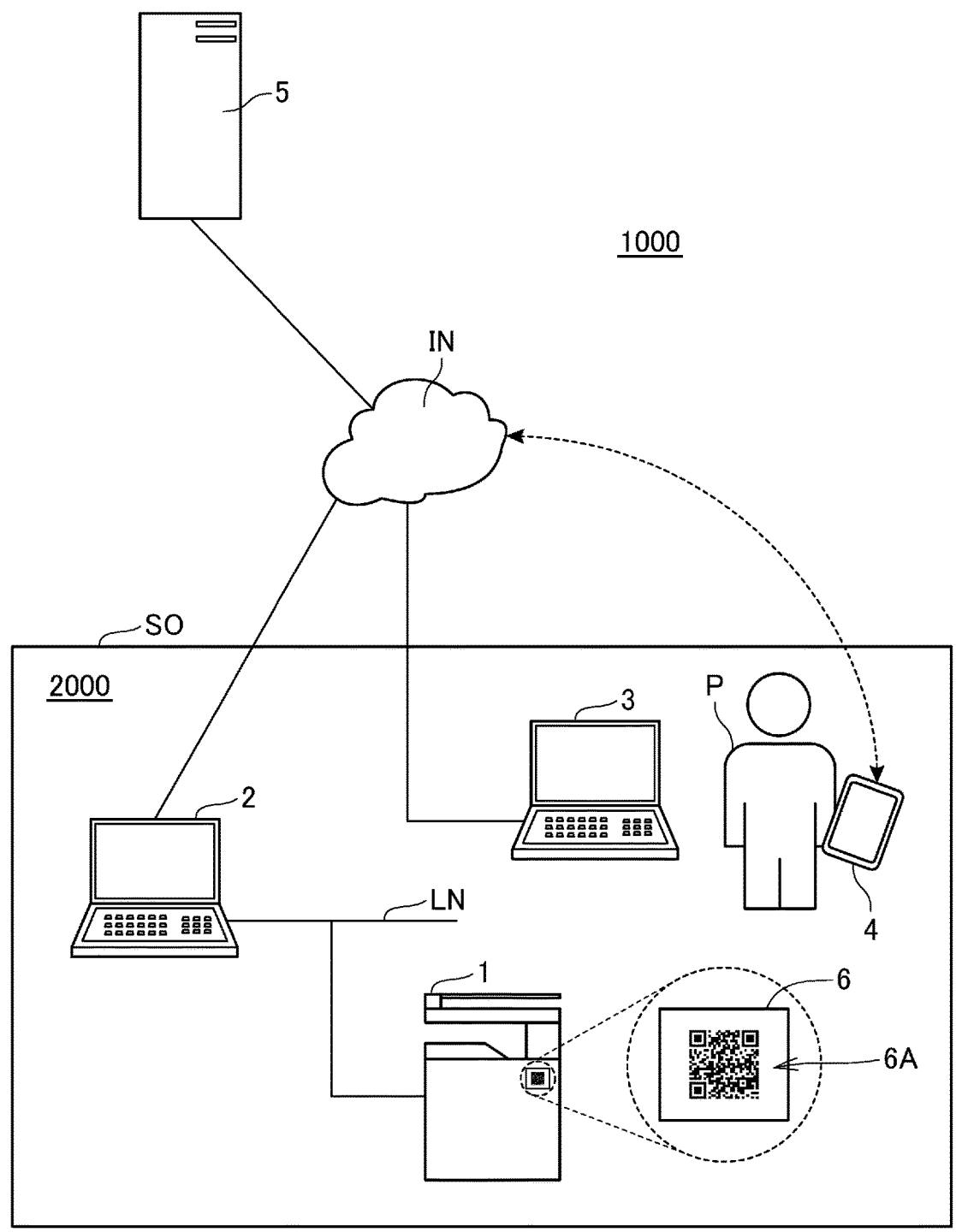
FIG. 1 illustrates the structure of a printing system.

FIG. 1 illustrates the structure of a printing system 1000.

As illustrated in FIG. 1, the printing system 1000 has an office system 2000. In FIG. 1, the printing system 1000 has one office system 2000. However, the printing system 1000 may have a plurality of office systems 2000.

The office system 2000 is used in an office. In FIG. 1, the office system 2000 is used in a shared office SO in which a working environment is shared by a plurality of companies or persons.

The shared office SO is an example of a place where a printing apparatus is provided. The printing system 1000 is not limited to a structure in which the shared office SO is included.

In the shared office SO to which the office system 2000 is applied, a printer 1 is provided. A user person P who uses the shared office SO can make a printout by using the printer 1 provided in the shared office SO. A plurality of printers 1 may be provided. Alternatively, one or a plurality of other printers of a model different from the printer 1 may be provided.

The printer 1 is an example of a printing apparatus.

Besides the printer 1, the office system 2000 has an office personal computer (PC) 2. The office PC 2 is an example of a print control apparatus. The printer 1 and office PC 2 are coupled to a local network LN included in the office system 2000.

The printer 1 is an apparatus that prints an image on a print medium. There is no limitation on the type of a print medium. Examples of print media include cut-sheets, rolled paper, and sheets made of a synthetic resin in predetermined sizes. There is also no limitation on the method by which the printer 1 performs printing. A dot impact printing method, a thermal dye-sublimation printing method, a thermal printing method, and the like can be used. In this embodiment, an ink jet printing method is exemplified as the printing method of the printer 1.

The printer 1 disposed in the shared office SO has a quick response (QR) tag 6, on which a QR code (registered trademark) 6A is printed, at a predetermined position on the case of the printer 1. A printer ID 5142 of the printer 1, to which the QR tag 6 is attached, is recorded on the QR code 6A. The printer ID 5142 is identification information that identifies the printer 1.

The QR tag 6 is an example of a medium. The printer ID 5142 is an example of second identification information.

The printer 1 disposed in the shared office SO may have a near field communication (NFC) tag instead of or together with the QR tag 6. In this case, the printer ID 5142 of the printer 1, to which the NFC tag is attached, is recorded on the NFC tag.

The NFC tag is another example of a medium.

The office PC 2 is a type of a PC. In FIG. 1, the office PC 2 is a notebook PC. However, the office PC 2 may be a desktop PC or a tablet PC. The office PC 2 is coupled to the Internet IN. A printer driver is installed in the office PC 2. The printer driver has a function for creating print data conforming to the command system of the printer 1 coupled to the office PC 2.

The printer driver will be referred to below as the office PC driver denoted by a reference numeral 211.

In FIG. 1, the office system 2000 has the printer 1. However, the office system 2000 may have one or a plurality of other printers besides the printer 1. A tag similar to the QR tag 6 or NFC tag attached to the printer 1 is attached to each of the other printers. A printer ID recorded in the tag attached to each of the other printers differs from the printer ID 5142 of the printer 1. When the office system 2000 has other printers, a printer driver that creates print data to be output to the other printers is installed in the office PC 2.

The printing system 1000 has a user's PC 3.

The user's PC 3 is used by the user person P who individually uses the shared office SO. In FIG. 1, the user's PC 3 is a notebook PC. However, the user's PC 3 may be a tablet PC. The user's PC 3 is coupled to the Internet IN. The user's PC 3 may be coupled to the Internet IN through a local network LN included in the office system 2000 or through a network other than the local network LN. A printer driver is installed in the user's PC 3.

The printer driver will be referred to below as the user's PC driver denoted by a reference numeral 312. The user's PC driver 312 may not match the printer 1.

The printing system 1000 has a smartphone 4. The smartphone 4 is an example of a terminal apparatus.

The smartphone 4 is the one owned by the user person P or lent to the user person P by the company to which the user person P belongs. The smartphone 4 is coupled to the Internet IN. An application program that performs printing in the shared office SO is installed in the smartphone 4.

The application program will be referred to below as the print application denoted by a reference numeral 411.

The printing system 1000 has a server 5.

The server 5 is a server apparatus coupled to the Internet IN. The server 5 executes predetermined arithmetic processing in response to a request or the like from a client coupled to the Internet IN. The server 5 transmits data based on an arithmetic processing result to the client, as necessary. In the relevant drawings, the server 5 is represented as a single block. However, this does not mean that the server 5 is structured by a single server apparatus. The server 5 may be structured by including a plurality of server apparatuses. When the server 5 is structured so as to be capable of executing various processing described later, the server 5 may have any type of structure.

Figure 2B:
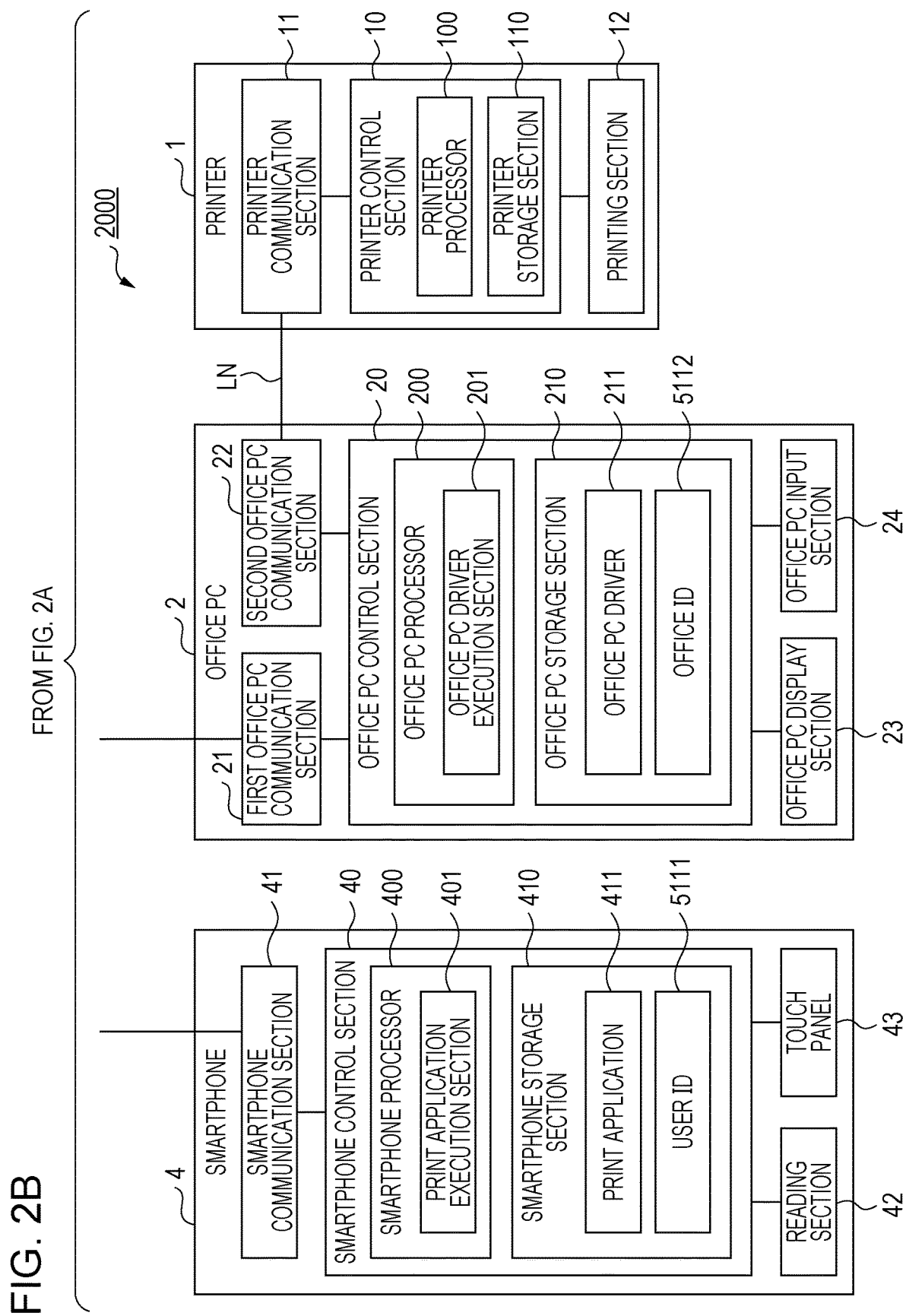

FIGS. 2A and 2B illustrate the functional structures of apparatuses included in the printing system 1000.

The printer 1 will be described.

The printer 1 has a printer control section 10, a printer communication section 11, and a printing section 12.

The printer control section 10 has a printer processor 100, which is a processor such as a central processing unit (CPU) or a micro-processing unit (MPU), that executes programs, as well as a printer storage section 110. The printer control section 10 controls the sections in the printer 1. In the printer control section 10, the printer processor 100 reads out a program stored in the printer storage section 110, after which hardware and software execute various processing.

The printer storage section 110 stores programs to be executed by the printer processor 100 and data to be processed by the printer processor 100. The printer storage section 110 also stores various other data, besides programs to be executed by the printer processor 100. The printer storage section 110 has a non-volatile storage area. The printer storage section 110 may also have a volatile storage area to form a work area used by the printer processor 100.

The printer communication section 11 has communication hardware conforming to a prescribed communication protocol. The printer communication section 11 communicates with the office PC 2 under control of the printer control section 10.

The printing section 12 has a printing mechanism that prints an image on a print medium. The printing section 12 has a print head that discharges ink, as well as a transport mechanism that transports a print medium. The printing section 12 may have sensors that detect the position and size of the print medium, a head scan mechanism that causes the print head to perform scanning, and the like.

The office PC 2 will be described.

The office PC 2 has an office PC control section 20, a first office PC communication section 21, a second office PC communication section 22, an office PC display section 23, and an office PC input section 24.

The office PC control section 20 is an example of a print control apparatus control section.

The office PC control section 20 has an office PC processor 200, which is a processor such as a CPU or MPU, that executes programs, as well as an office PC storage section 210. The office PC control section 20 controls the sections in the office PC 2. The office PC storage section 210 is an example of a print control apparatus storage section. In the office PC control section 20, the office PC processor 200 reads out a program stored in the office PC storage section 210, after which hardware and software execute various processing. The office PC control section 20 functions as an office PC driver execution section 201 by executing the office PC driver 211 stored in the office PC storage section 210.

The office PC storage section 210 stores programs to be executed by the office PC processor 200 and data to be processed by the office PC processor 200. The office PC storage section 210 also stores the office PC driver 211, an office ID 5112, which is identification information that identifies the shared office SO, and various other data, besides programs to be executed by the office PC processor 200. The office PC storage section 210 has a non-volatile storage area. The office PC storage section 210 may also have a volatile storage area to form a work area used by the office PC processor 200.

The first office PC communication section 21 has communication hardware conforming to a prescribed communication protocol. The first office PC communication section 21 communicates with the server 5 coupled to the first office PC communication section 21 through the Internet IN, under control of the office PC control section 20.

The second office PC communication section 22 has communication hardware conforming to a prescribed communication protocol. The second office PC communication section 22 communicates with the printer 1 coupled to the second office PC communication section 22, under control of the office PC control section 20.

The office PC display section 23, which is a type of display, displays information under control of the office PC control section 20. The office PC display section 23 may be an external display disposed separately from the office PC 2.

The office PC input section 24 is an input interface coupled to operation switches, a panel having touch input functions, a mouse, a keyboard, and other input devices provided for the office PC 2. The office PC input section 24 detects an operation performed by the user on an input device, and outputs a detection result to the office PC control section 20. The office PC control section 20 executes processing corresponding to the operation performed on the input device, according to the input from the office PC input section 24.

The user's PC 3 will be described.

The user's PC 3 has a user's PC control section 30, a user's PC communication section 31, a user's PC display section 32, and a user's PC input section 33.

The user's PC control section 30 has a user's PC processor 300, which is a processor such as a CPU or MPU, that executes programs, as well a user's PC storage section 310. The user's PC control section 30 controls the sections in the user's PC 3. In the user's PC control section 30, the user's PC processor 300 reads out a program stored in the user's PC storage section 310, after which hardware and software execute various processing. The user's PC control section 30 functions as a creation application execution section 301 when the user's PC processor 300 executes a creation application 311 stored in the user's PC storage section 310. The user's PC control section 30 also functions as a user's PC driver execution section 302 when the user's PC processor 300 executes the user's PC driver 312 stored in the user's PC storage section 310.

The creation application 311 is an application program that creates a print job 5132, which is a document, an image, or another type of data.

The user's PC storage section 310 stores programs to be executed by the user's PC processor 300 and data to be processed by the user's PC processor 300. The user's PC storage section 310 stores the creation application 311, the user's PC driver 312, a user ID 5111, and various other data, besides programs to be executed by the user's PC processor 300. The user's PC storage section 310 has a non-volatile storage area. The user's PC storage section 310 may also have a volatile storage area to form a work area used by the user's PC processor 300.

The user ID 5111 is an example of first identification information.

The user's PC communication section 31 has communication hardware conforming to a prescribed communication protocol. The user's PC communication section 31 communicates with the server 5 coupled to the user's PC communication section 31 through the Internet IN, under control of the user's PC control section 30.

The user's PC display section 32, which is a type of display, displays information under control of the user's PC control section 30.

The user's PC input section 33 is an input interface coupled to operation switches, a panel having touch input functions, a mouse, a keyboard, and other input devices provided for the user's PC 3. The user's PC input section 33 detects an operation performed by the user on an input device, and outputs a detection result to the user's PC control section 30. The user's PC control section 30 executes processing corresponding to the operation performed on the input device, according to the input from the user's PC input section 33.

The smartphone 4 will be described.

The smartphone 4 has a smartphone control section 40, a smartphone communication section 41, a reading section 42, and a touch panel 43.

The smartphone control section 40 has a smartphone processor 400, which is a processor such as a CPU or MPU, that executes programs, as well as smartphone storage section 410. The smartphone control section 40 controls the sections in the smartphone 4. The smartphone storage section 410 is an example of a storage section. In the smartphone control section 40, the smartphone processor 400 reads out a program stored in the smartphone storage section 410, after which hardware and software execute various processing. The smartphone control section 40 functions as a print application execution section 401 when the smartphone processor 400 executes the print application 411 stored in the smartphone storage section 410.

The smartphone storage section 410 stores programs to be executed by the smartphone processor 400 and data to be processed by the smartphone processor 400. The smartphone storage section 410 stores the print application 411, the user ID 5111, and various other data, besides programs to be executed by the smartphone processor 400. The smartphone storage section 410 has a non-volatile storage area. The smartphone storage section 410 may also have a volatile storage area to form a work area used by the smartphone processor 400.

The smartphone communication section 41 has communication hardware conforming to a prescribed communication protocol. The smartphone communication section 41 communicates with the server 5 coupled to the smartphone communication section 41 through the Internet IN, under control of the smartphone control section 40.

The reading section 42, which has a camera and an NFC module, reads information recorded on a tag and outputs the read data to the smartphone control section 40.

The touch panel 43 has a display panel such as a liquid crystal display panel, as well as touch sensors laminated on the display panel or formed integrally with it. The display panel displays various images under control of the smartphone control section 40. The touch sensor detects a touch operation and outputs the detection result to the smartphone control section 40. The smartphone control section 40 executes processing corresponding to the touch operation, according to the input from the touch sensor.

The server 5 will be described.

The server 5 has a server control section 50 and a server communication section 51.

The server control section 50 has a server processor 500, which is a processor such as a CPU or MPU, that executes programs, as well a server storage section 510. The server control section 50 controls the sections in the server 5. In the server control section 50, the server processor 500 reads out a program stored in the server storage section 510, after which hardware and software execute various processing.

The server storage section 510 stores programs to be executed by the server processor 500 and data to be processed by the server processor 500. The server storage section 510 stores a user management database 511, a terminal management database 512, a print job management database 513, an office management database 514, and various other data, besides programs to be executed by the smartphone processor 500. The server storage section 510 has a non-volatile storage area. The server storage section 510 may also have a volatile storage area to form a work area used by the server processor 500.

Figure 3:
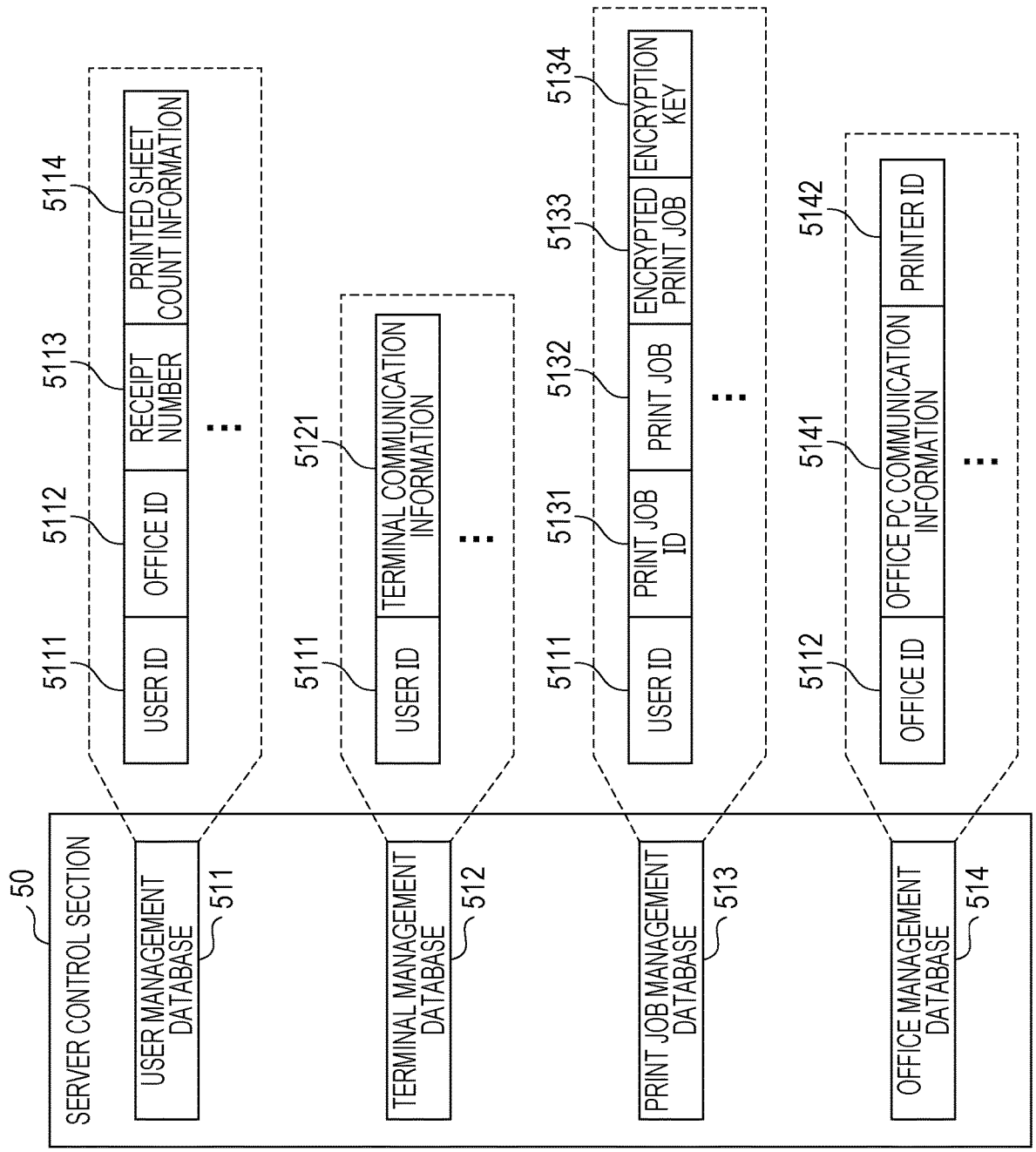
FIG. 3 illustrates examples of databases stored in a server storage section.

FIG. 3 illustrates examples of databases stored in the server storage section 510.

The user management database 511 manages information related to the user person P who uses the printing system 1000. Specifically, the user management database 511 stores the user ID 5111. When the user person P uses the shared office SO, the user management database 511 may include, in one user record, the office ID 5112, a receipt number 5113, and a printed sheet count information 5114 in correlation to the user ID 5111.

The user ID 5111 is user identification information that identifies the user person P. When the user's PC 3 is to be coupled to the server 5, the user ID 5111 may be created on the user's PC 3. When the user person P uses the print application 411 installed in the smartphone 4, the print application 411 may create the user ID 5111 as identification information that identifies the user person P who uses the print application 411. When the print application 411 creates user IDs 5111, one user ID 5111 is assigned to each user who uses the print application 411.

As described above, the office ID 5112 is identification information that identifies the shared office SO. The office ID 5112 is assigned in advance and is stored in the server 5.

The receipt number 5113 identifies the user person P who uses the shared office SO. When the user of the smartphone 4 is accepted as the user person P who uses the shared office SO, the receipt number 5113 is issued to the user.

The printed sheet count information 5114 indicates the number of sheets printed by the printer 1 disposed in the shared office SO.

The terminal management database 512 manages information related to the smartphone 4 in which the print application 411 is installed. The terminal management database 512 has the user ID 5111 and terminal communication information 5121 in one terminal record. The terminal communication information 5121 indicates at least any one of terminal-specific information that identifies the terminal, the internet protocol (IP) address of the terminal apparatus, and its media access control (MAC) address. One record in the terminal management database 512 may have information involved in communication other than the terminal-specific information, the IP address, and its MAC address.

The terminal communication information 5121 is used when information is transmitted to the smartphone 4 in which the print application 411 is installed and when the smartphone 4 receives information.

The print job management database 513 manages information related to the print job 5132. One record in the print job management database 513 includes the user ID 5111, a print job ID 5131, the print job 5132, an encrypted print job 5133, and an encryption key 5134.

The print job ID 5131 is identification information that identifies the print job 5132. The print job ID 5131 is an example of print job identification information.

The print job 5132 included in the job record in the print job management database 513 has a predetermined data format into which the data format of the print job 5132 created by the creation application 311 is converted by the user's PC driver 312. An example of the predetermined data format is Portable Document Format (PDF).

The encrypted print job 5133 is obtained by using a predetermined encryption technology to encrypt the print job 5132 associated with the encrypted print job 5133 in the job record.

The encryption key 5134 is data used to decrypt the encrypted print job 5133 associated with the encryption key 5134 in the job record.

The office management database 514 manages information related to the shared office SO. One record in the office management database 514 includes the office ID 5112, office PC communication information 5141, and the printer ID 5142. When another printer is provided in the shared office SO, the office record includes the printer ID of the other printer. The office management database 514 is an example of management information.

The office PC communication information 5141 is transmitted to the office PC 2 disposed in the shared office SO that is identified by the office ID 5112 associated with the office PC communication information 5141 in a record. The office PC communication information 5141 includes the IP address of the office PC 2, the PC identification information that identifies the office PC 2, and other communication information involved in communication with the office PC 2. The office PC communication information 5141 is an example of print control apparatus communication information.

Referring again to FIGS. 2A and 2B, the server communication section 51 has communication hardware conforming to a prescribed communication protocol. The server communication section 51 communicates with devices coupled to the Internet IN, under control of the server control section 50. Specifically, the server communication section 51 communicates with the office PC 2, user's PC 3, and smartphone 4.

Operations of the printing system 1000 will be described.

The usage start operation of the printing system 1000 will be described. The usage start operation is performed at a time when the user person P starts to use the shared office SO.

Figure 4:
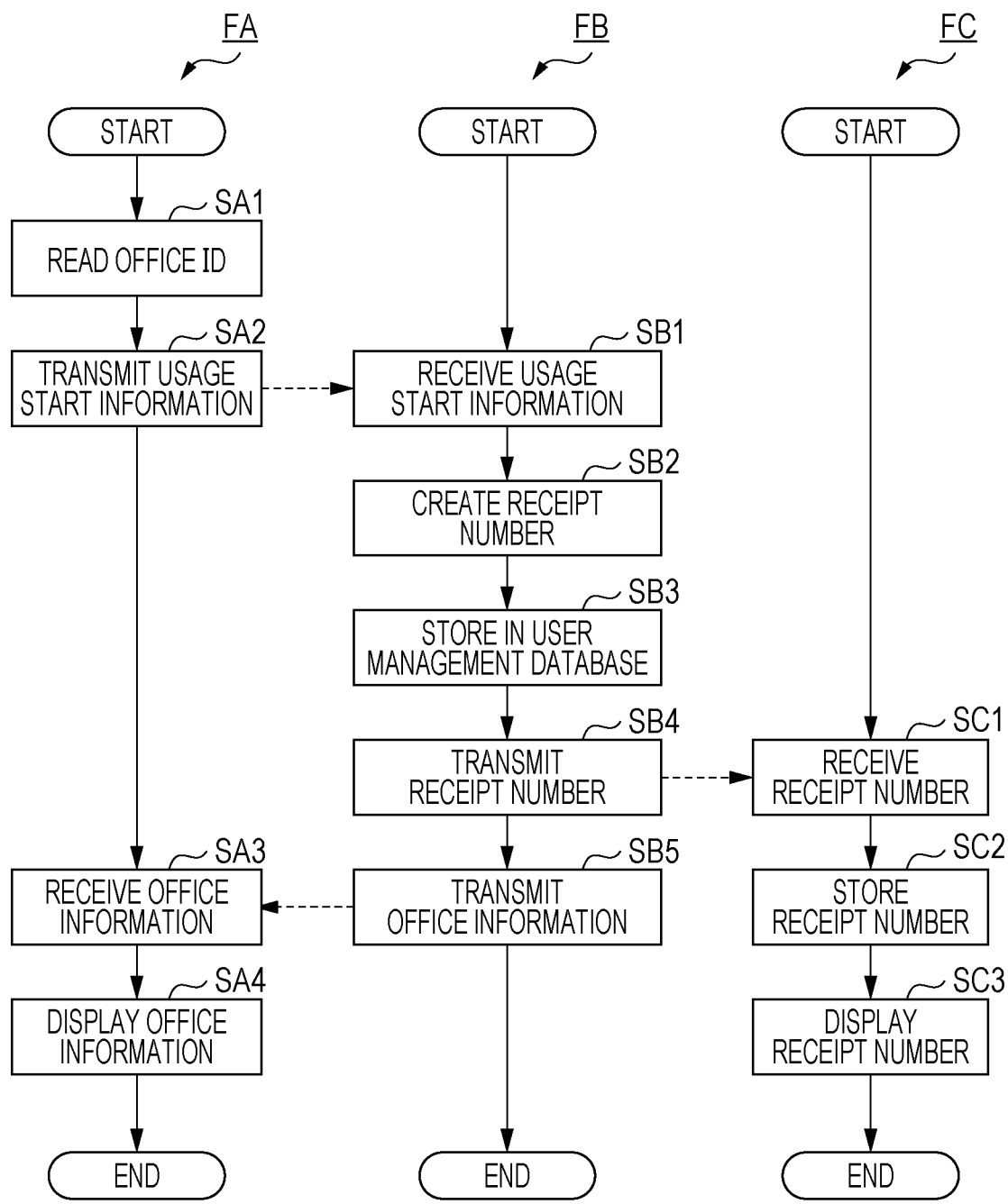
FIG. 4 illustrates flowcharts indicating operations of the printing system.

FIG. 4 illustrates flowcharts indicating operations of the printing system 1000.

In FIG. 4, the flowchart FA illustrates the operation of the smartphone 4, the flowchart FB illustrates the operation of the server 5, and the flowchart FC illustrates the operation of the office PC 2.

In the usage start operation illustrated in FIG. 4, the print application 411 installed in the smartphone 4 is started up by the user person P, and the smartphone control section 40 functions as the print application execution section 401.

The print application execution section 401 in the smartphone 4 causes the reading section 42 to read the office ID 5112 (step SA1).

At the receipt counter of the shared office SO, there is an office tag on which the office ID 5112 is recorded. When the user person P of the smartphone 4 in which the print application 411 has been started up accesses the office tag, the print application execution section 401 causes the reading section 42 to read the office ID 5112.

After the office ID 5112 has been read, the print application execution section 401 causes the smartphone communication section 41 to transmit usage start information, which indicates the shared office SO will start to be used, to the server 5 (step SA2).

The usage start information transmitted in step SA2 includes the office ID 5112 read in step SA1 and the user ID 5111 stored in the smartphone storage section 410.

As illustrated in the flowchart FB, the server control section 50 in the server 5 causes the server communication section 51 to receive the usage start information (step SB1).

The server control section 50 creates the receipt number 5113 according to the office ID 5112 included in the received usage start information (step SB2).

The receipt number 5113 in step SB2 is information that identifies the user person P who uses the shared office SO within a predetermined period, such as within one day. Each time the user person P uses the shared office SO, the receipt number 5113 is uniquely assigned.

After having created the receipt number 5113, the server control section 50 creates a user record that includes the user ID 5111 and office ID 5112, which are included in the received usage start information, the created receipt number 5113, and the printed sheet count information 5114, after which the server control section 50 stores the created user record in the user management database 511 (step SB3). At the point in time at which the user record was created, the value of the printed sheet count information 5114 is 0. The server storage section 510 stores information in the office management database 514 in advance. By storing a user record in the user management database 511, the server 5 associates the user ID 5111 with the office PC 2 and office PC communication information 5141 through the office ID 5112. Due to the user management database 511 and office management database 514, the user person P and office PC 2 are mutually associated.

After having stored the created user record in the user management database 511, the server control section 50 causes the server communication section 51 to transmit the receipt number 5113 created in step SB2 to the office PC 2 disposed in the shared office SO indicated by the office ID 5112 included in the received usage start information (step SB4).

In step SB4, the server control section 50 references the office management database 514 and transmits the receipt number 5113 according to the office PC communication information 5141 associated with the office ID 5112 included in the received usage start information.

As illustrated in the flowchart FC, the office PC control section 20 in the office PC 2 causes the first office PC communication section 21 to receive the receipt number 5113 from the server 5 (step SC1).

The office PC control section 20 stores the received receipt number 5113 in the office PC storage section 210 (step SC2).

The office PC control section 20 displays the received receipt number 5113 on the office PC display section 23 (step SC3). Thus, when the user person P starts to use the shared office SO, the receipt number 5113 is issued to the user person P.

The method in which the receipt number 5113 is issued is not limited to displaying it. The receipt number 5113 may be issued in the form of a paper slip. In this case, an issuing machine is coupled to the office PC 2. The office PC control section 20 causes the issuing machine to create a paper slip on which the received receipt number 5113 is printed. Alternatively, the office PC control section 20 may display a QR code of the receipt number 5113 on the office PC display section 23. When the smartphone 4 of the user person P reads the displayed QR code, the receipt number 5113 is issued to the user person P.

The description of the operation of the server 5 will now be continued. As illustrated in the flowchart FB, the server control section 50 causes the server communication section 51 to transmit, to the smartphone 4, the received receipt number 5113, as well as office information related to the shared office SO indicated by the office ID 5112 included in the received usage start information (step SB5). The office information includes information indicating the name of the shared office SO. The office information is stored in a prescribed storage area in correspondence with the office ID 5112. The server control section 50 may transmit any of the office information and receipt number 5113.

As illustrated in the flowchart FA, the print application execution section 401 in the smartphone 4 causes the smartphone communication section 41 to receive office information and the receipt number 5113 (step SA3) and displays the received office information on the touch panel 43 (step SA4). The receipt number 5113 is stored in the smartphone storage section 410.

The usage start operation is performed when the printing system 1000 is applied to the shared office SO. When the printing system 1000 is applied to an ordinary office or a free-address office, the usage start operation is not performed. Although in the operations in FIG. 4, the server 5 issues the receipt number 5113, this is not a limitation. A shared office management application installed in the office PC 2 may issue the receipt number 5113. The issued receipt number 5113 may be transmitted to the server 5 and may be stored in the user management database 511 in the server 5. The shared office management application displays the QR code representing the receipt number 5113 on the office PC display section 23. When the smartphone 4 reads the QR code, this means that the shared office management application issues the receipt number 5113. When the shared office management application issues the receipt number 5113, the office PC 2 assigns the office ID 5112 to the receipt number 5113 and transmits the receipt number 5113 to the server 5. The office PC 2 may not transmit the receipt number 5113 to the server 5. In this case, the receipt number 5113 may be used for management in the shared office SO.

Next, the print operation of the printing system 1000 will be described. The print operation is performed when the user person P uses the printer 1 disposed in the shared office SO for printing.

The user person P issues a print execution command to the user's PC 3 at a place in the shared office SO in which the user person P is working. The user person P moves to the printer 1 and uses the smartphone 4 to have the printer 1 execute printing.

The print operation of the printing system 1000 will be described, the print operation being executed in response to print execution command issued by the user person P to the user's PC 3.

Figure 5:
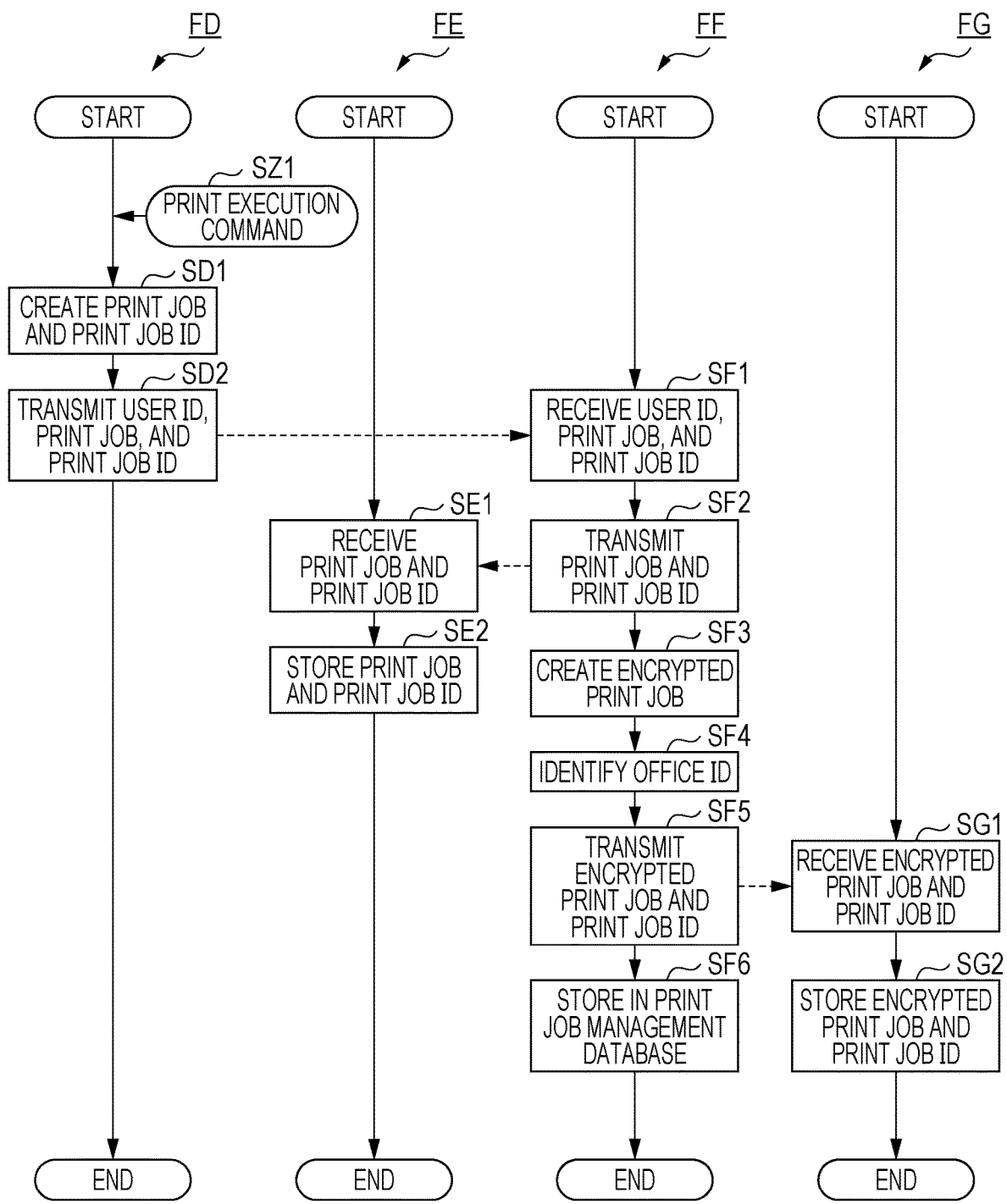
FIG. 5 also illustrates flowcharts indicating operations of the printing system.

FIG. 5 illustrates flowcharts indicating operations of the printing system 1000.

In FIG. 5, the flowchart FD illustrates the operation of the user's PC 3, the flowchart FE illustrates the operation of the smartphone 4, the flowchart FF illustrates the operation of the server 5, and the flowchart FG illustrates the operation of the office PC 2.

When the user person P operates the user's PC 3 to issue a print execution command to the user's PC 3 (step SZ1), the user's PC driver execution section 302 creates the print job 5132 in a predetermined data format obtained by conversion and also creates print job ID 5131 that identifies the print job 5132 (step SD1).

The user's PC driver execution section 302 adds the user ID 5111 stored in the user's PC storage section 310 and the created print job ID 5131 to the created print job 5132, and then causes the user's PC communication section 31 to transmit the print job 5132 to the server 5 (step SD2).

As illustrated in the flowchart FF, the server control section 50 in the server 5 causes the server communication section 51 to receive the print job 5132, to which the user ID 5111 and print job ID 5131 are added (step SF1).

After the server communication section 51 has received the print job 5132, the server control section 50 causes the server communication section 51 to transmit the received print job 5132 to the smartphone 4, according to the terminal communication information 5121 corresponding to the received user ID 5111, the terminal communication information 5121 being included in the terminal management database 512 (step SF2). The print job ID 5131 received in step SF1 is added to the print job 5132 before it is transmitted.

As illustrated in the flowchart FE, the print application execution section 401 in the smartphone 4 causes the smartphone communication section 41 to receive the print job 5132 to which the print job ID 5131 is added (step SE1).

After the smartphone communication section 41 has received the print job 5132 to which the print job ID 5131 is added, the print application execution section 401 stores, in the smartphone storage section 410, the received print job ID 5131 and print job 5132 in correlation to each other (step SE2).

The user person P can, for example, view or edit the received print job 5132 by using the print application 411 installed in the smartphone 4.

The description of the flowchart FF will now be continued. The server control section 50 encrypts the received print job 5132 to create the encrypted print job 5133 (step SF3). When the print job 5132 is not encrypted, the process proceeds to step SF5.

After having received the print job 5132, the server control section 50 references the user management database 511 and identifies the office ID 5112 related to the user ID 5111 received in step SF1 (step SF4).

After having identified the office ID 5112, the server control section 50 causes the server communication section 51 to transmit the created encrypted print job 5133 or the print job 5132 to the office PC 2 disposed in the shared office SO indicated by the identified office ID 5112 (step SF5).

In step SF5, the server control section 50 causes the server communication section 51 to transmit the encrypted print job 5133 or print job 5132, according to the office PC communication information 5141 related to the office ID 5112 identified with reference to the office management database 514 in step SF4.

The print job ID 5131 received in step SF1 is added to the encrypted print job 5133 or print job 5132 before it is transmitted in step SF5.

As illustrated in the flowchart FG, the office PC control section 20 in the office PC 2 causes the first office PC communication section 21 to receive the encrypted print job 5133 or print job 5132 to which the print job ID 5131 is added (step SG1).

After the first office PC communication section 21 has received the encrypted print job 5133 or print job 5132, the office PC control section 20 stores, in the office PC storage section 210, the received print job ID 5131 and the received encrypted print job 5133 or print job 5132 in correlation to each other (step SG2).

The description of the flowchart FF will now be continued. After the encrypted print job 5133 or print job 5132 has been transmitted to the office PC 2, the server control section 50 creates a job record that includes the user ID 5111, the print job ID 5131, the encrypted print job 5133, the print job 5132, and the encryption key 5134 that decrypts the encrypted print job 5133, and stores the created job record in the print job management database 513 (step SF6). In the job record, the user ID 5111 and print job 5132 are associated with each other by the server 5.

In the operations in FIG. 5, at the time when the server communication section 51 receives the print job 5132 or encrypted print job 5133 from the user's PC 3, the server control section 50 transmits the print job 5132 or encrypted print job 5133 to the office PC 2. However, the transmission of the print job 5132 or encrypted print job 5133 may be placed on hold. When the server control section 50 places the transmission on hold, the server control section 50 may transmit the print job 5132 or encrypted print job 5133 at the time when, upon receipt of a smartphone's print command, described later, from the smartphone 4, the server control section 50 transmits a print command to the office PC 2. When the server control section 50 transmits the print job 5132 or encrypted print job 5133 at the time when the server control section 50 transmits a print command to the office PC 2, the server control section 50 may identify the office PC 2, which is the transmission destination, according to the printer ID 5142 included in the smartphone's print command from the smartphone 4. When the server control section 50 identifies the office PC 2, which is the transmission destination, according to the printer ID 5142 included in the smartphone's print command from the smartphone 4, step SF4, in which the office ID 5112 is identified, is not needed.

Next, the print operation of the printing system 1000 will be described in which the smartphone 4 is used to cause printer 1 to execute printing according to the print job 5132 transmitted from the office PC 2 to the server 5.

In the print operation, a case in which the smartphone 4 transmits the receipt number 5113 and a case in which the smartphone 4 does not transmit the receipt number 5113 will be described. When the user person P causes the printing system 1000 to perform a print operation without performing the usage start operation in FIG. 4, the printing system 1000 performs the print operation according to a flow in which the receipt number 5113 is not transmitted. When the server 5 issues the receipt number 5113 in the usage start operation in FIG. 4, the printing system 1000 performs the print operation in FIG. 7.

Figure 6:
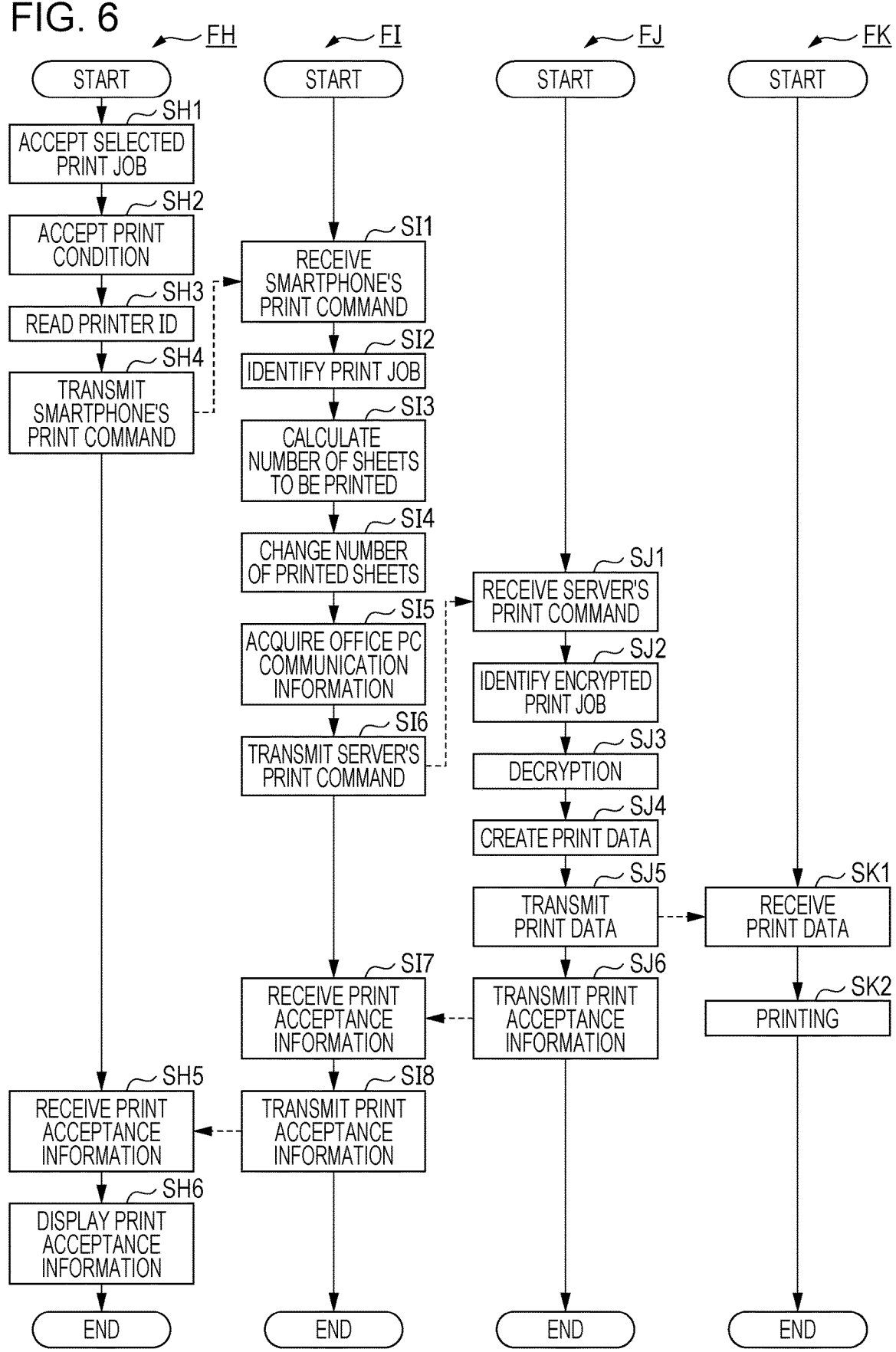
FIG. 6 also illustrates flowcharts indicating operations of the printing system.

FIG. 6 illustrates flowcharts indicating operations of the printing system 1000.

The print operation, illustrated in FIG. 6, of the printing system 1000 is performed when the smartphone 4 does not transmit the receipt number 5113.

In FIG. 6, the flowchart FH illustrates the operation of the smartphone 4, the flowchart FI illustrates the operation of the server 5, the flowchart FJ illustrates the operation of the office PC 2, and the flowchart FK illustrates the operation of the printer 1.

As illustrated in the flowchart FH, the print application execution section 401 in the smartphone 4 accepts the print job 5132 selected by the user person P (step SH1).

As illustrated in the flowchart FH, the print application execution section 401 in the smartphone 4 accepts, from the user person P, a print condition involved in printing based on the print job 5132 (step SH2).

The print application execution section 401 creates specification information according to the accepted print condition. The specification information includes the print condition applied to the printer 1 during printing. When the print job 5132 selected in step SH1 is composed of a plurality of pages, the specification information includes information indicating pages to be printed and information indicating the number of copies. The specification information may include information indicating a print mode, color printing or monochrome printing.

As illustrated in the flowchart FH, the print application execution section 401 in the smartphone 4 causes the reading section 42 to read the printer ID 5142 from the QR tag 6 (step SH3). Specifically, the user person P of the smartphone 4, in which the print application 411 operates, takes a picture of the QR tag 6 attached to the printer 1 with the reading section 42. The print application execution section 401 reads the printer ID 5142 according to the captured data.

After having read the printer ID 5142, the print application execution section 401 causes the smartphone communication section 41 to transmit a smartphone's print command to the server 5 (step SH4). The smartphone's print command indicates a print command transmitted from the smartphone 4. The smartphone's print command is an example of a first print command.

The smartphone's print command includes the printer ID 5142 read in step SH3, the user ID 5111 stored in the smartphone storage section 410, the print job ID 5131 associated with the print job 5132 selected in step SH1, and the accepted specification information.

As illustrated in the flowchart FI, the server control section 50 in the server 5 causes the server communication section 51 to receive the smartphone's print command (step SI1).

After the smartphone's print command has been received, the server control section 50 references the print job management database 513 and identifies the print job 5132 associated with the print job ID 5131 included in the received smartphone's print command (step SI2).

Upon identification of the print job 5132, the server control section 50 calculates the number of sheets to be printed as per the received smartphone's print command, according to the print job 5132 and the specification information included in the received smartphone's print command (step SI3).

The server control section 50 adds the number of sheets to be printed, the number being calculated in step SI3, to the number of printed sheets indicated in the printed sheet count information 5114 associated, in the user management database 511, with the user ID 5111 included in the received smartphone's print command, and changes the number of printed sheets indicated in the printed sheet count information 5114 to the value resulting from the addition (step SI4).

Upon identification of the print job 5132, the server control section 50 identifies the office PC 2 coupled to the printer 1 indicated by the printer ID 5142 according to the office management database 514 and the printer ID 5142 included in the received smartphone's print command, and acquires the office PC communication information 5141 about the office PC 2 (step SI5).

Upon acquisition of the office PC communication information 5141 about the office PC 2, the server control section 50 causes the server communication section 51 to transmit, according to the identified office PC communication information 5141, a server's print command to the office PC 2 corresponding to the office PC communication information 5141 (step SI6). The server's print command indicates a print command transmitted from the server 5. The server's print command is an example of a second print command.

The server's print command transmitted in step SI6 includes the print job ID 5131, printer ID 5142, user ID 5111, and specification information. The server's print command may include the office ID 5112 and the encryption key 5134 associated with the print job ID 5131 in the print job management database 513. The server control section 50 may transmit the encryption key 5134 to the office PC 2 at a time different from when the server control section 50 transmits the server's print command.

As illustrated in the flowchart FJ, the office PC driver execution section 201 in the office PC 2 causes the first office PC communication section 21 to receive the server's print command (step SJ1).

The office PC driver execution section 201 identifies the print job 5132 or encrypted print job 5133 stored in the office PC storage section 210, according to the print job ID 5131 included in the received server's print command (step SJ2).

When the office PC driver execution section 201 has identified the encrypted print job 5133, the office PC driver execution section 201 decrypts it by using the received encryption key 5134 (step SJ3).

Upon decryption of the encrypted print job 5133, the office PC driver execution section 201 creates print data according to the decrypted print job 5132 or to the print job 5132 and specification information included in the server's print command (step SJ4).

Upon creation of the print data, the office PC driver execution section 201 causes the second office PC communication section 22 to transmit the created print data to the printer 1 (step SJ5).

As illustrated in the flowchart FK, the printer control section 10 in the printer 1 causes the printer communication section 11 to receive the print data (step SK1).

The printer control section 10 causes the printing section 12 to perform printing according to the received print data (step SK2).

The description of the flowchart FJ will now be continued. The office PC driver execution section 201 causes the first office PC communication section 21 to transmit print acceptance information, which indicates that printing by the smartphone 4 has been accepted, to the server 5 as a response to the server's print command (step SJ6).

As illustrated in the flowchart FI, when the print acceptance information is received (step SI7), the server control section 50 in the server 5 causes the server communication section 51 to transmit the received print acceptance information to the smartphone 4 as a response to the smartphone's print command (step SI8).

As illustrated in the flowchart FH, the smartphone control section 40 causes the smartphone communication section 41 to receive the print acceptance information (step SH5) and produces a display on the touch panel 43 according to the print acceptance information (step SH6).

Figure 7:
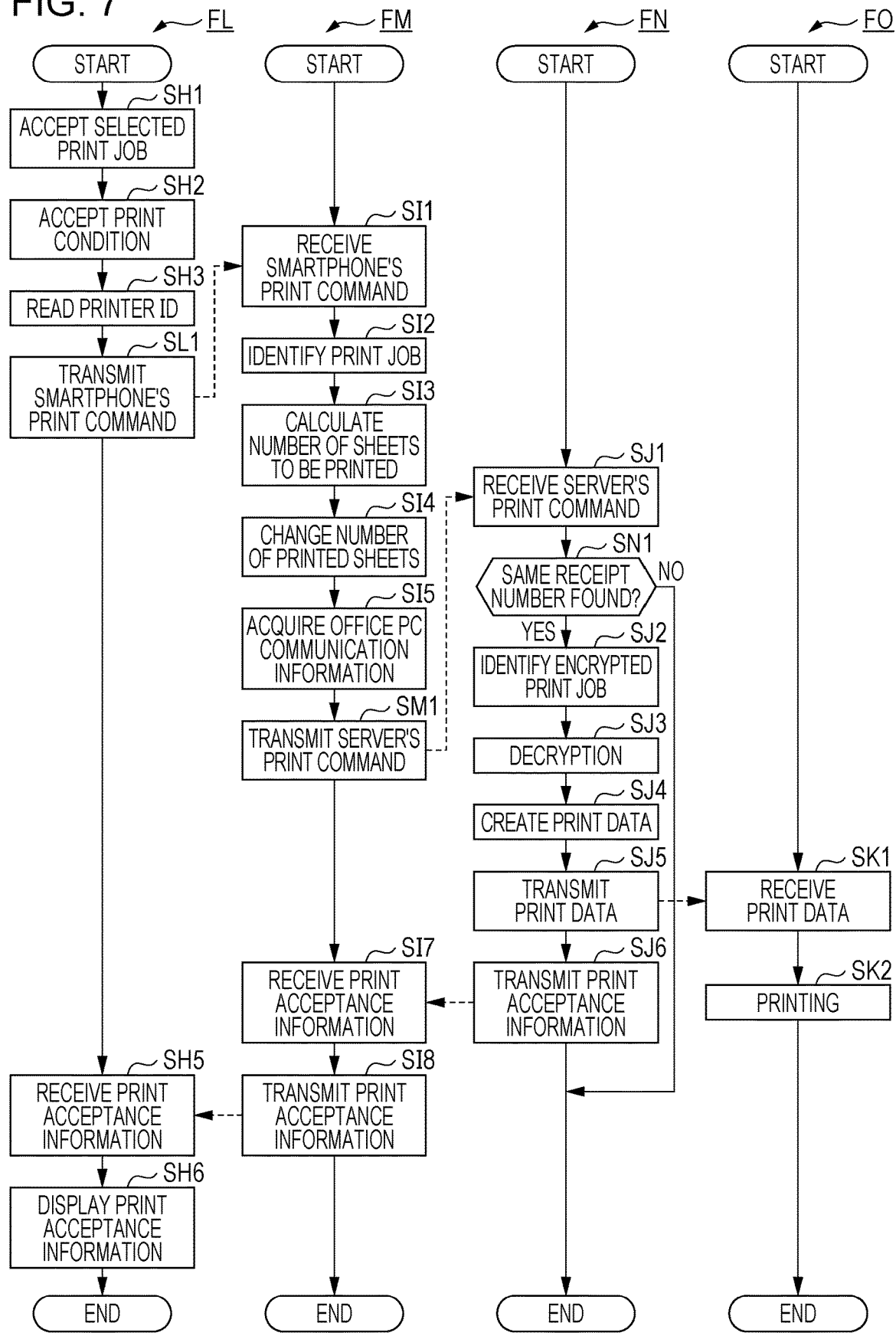
FIG. 7 also illustrates flowcharts indicating operations of the printing system.

FIG. 7 illustrates flowcharts indicating operations of the printing system 1000.

The print operation, illustrated in FIG. 7, of the printing system 1000 is performed when the smartphone 4 transmits the receipt number 5113. The smartphone 4 acquires the receipt number 5113 and stores it in advance. Alternatively, when the receipt number 5113 is issued from the office PC control section 20, the smartphone 4 reads the QR code displayed on the office PC display section 23 to acquire the receipt number 5113 and stores it.

In FIG. 7, steps that are the same as in the flowcharts in FIG. 6 will be given the same step numbers and their detailed descriptions will be appropriately omitted.

In FIG. 7, the flowchart FL illustrates the operation of the smartphone 4, the flowchart FM illustrates the operation of the server 5 the flowchart FN illustrates the operation of the office PC 2 and the flowchart FO illustrates the operation of the printer 1.

The print application execution section 401 in the smartphone 4 causes the reading section 42 to read the printer ID 5142, after which the smartphone 4 causes the smartphone communication section 41 to transmit a smartphone's print command to the server 5 (step SL1).

The smartphone's print command transmitted in step SL1 includes the printer ID 5142 read in step SH3, the print job ID 5131 selected in step SH1, the specification information accepted in step SH2, and the receipt number 5113. The smartphone's print command may include the user ID 5111 stored in the smartphone storage section 410.

Referring to the flowchart FM, the server control section 50 causes the server communication section 51 to transmit a server's print command to the office PC 2 corresponding to the identified office PC communication information 5141 (step SM1).

The server's print command transmitted in step SM1 includes the printer ID 5142, print job ID 5131, specification information, and receipt number 5113, which are included in the received smartphone's print command. The server's print command may include the encryption key 5134 associated with the print job ID 5131 in the print job management database 513. The server control section 50 may transmit the encryption key 5134 at a time different from when the server control section 50 transmits the server's print command.

As illustrated in the flowchart FN, the office PC driver execution section 201 decides whether the receipt number 5113 included in the received server's print command is found in the office PC storage section 210 (step SN1).

When the office PC driver execution section 201 decides that the receipt number 5113 included in the received server's print command is not found in the office PC storage section 210 (No in step SN1), the office PC driver execution section 201 terminates the processing.

When the office PC driver execution section 201 decides that the receipt number 5113 included in the received server's print command is found in the office PC storage section 210 (Yes in step SN2), the office PC driver execution section 201 identifies the encrypted print job 5133 or print job 5132 associated with the print job ID 5131 included in the received server's print command (step SJ2).

Next, the termination operation of the printing system 1000 will be described. The termination operation is performed when the user person P terminates the use of the shared office SO.

Figure 8:
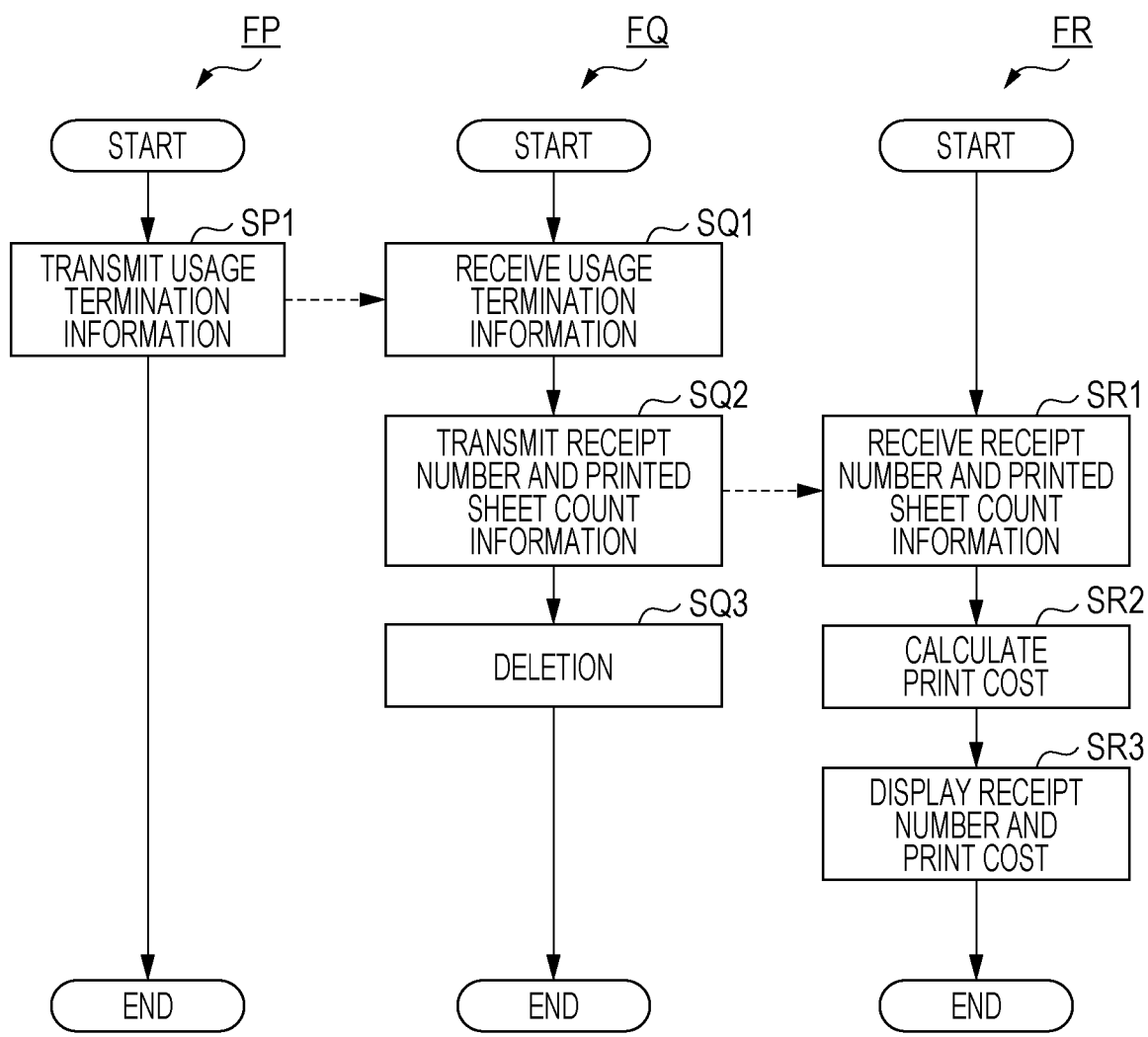
FIG. 8 also illustrates flowcharts indicating operations of the printing system.

FIG. 8 illustrates flowcharts indicating operations of the printing system 1000. Specifically, FIG. 8 illustrates the termination operation performed when the user person P uses the smartphone 4 to transmit a usage termination command. The termination operation is executed after the usage start operation in FIG. 4 has been performed.

In FIG. 8, the flowchart FP illustrates the operation of the smartphone 4, the flowchart FQ illustrates the operation of the server 5, and the flowchart FR illustrates the operation of the office PC 2.

When the user person P issues a usage termination command to the smartphone 4, the print application execution section 401 in the smartphone control section 40 causes the smartphone communication section 41 to transmit, to the server 5, usage termination information indicating the termination of the use of the shared office SO (step SP1).

The usage termination information includes the user ID 5111 stored in the smartphone storage section 410.

As illustrated in the flowchart FQ, the server control section 50 in the server 5 causes the server communication section 51 to receive the usage termination information (step SQ1).

The server control section 50 causes the server communication section 51 to transmit the receipt number 5113 and printed sheet count information 5114, which are associated, in the user management database 511, with the user ID 5111 included in the received usage termination information, to the office PC 2 identified by the office ID 5112 associated with the user ID 5111 (step SQ2).

As illustrated in the flowchart FR, the office PC control section 20 in the office PC 2 causes the first office PC communication section 21 to receive the receipt number 5113 and printed sheet count information 5114 (step SR1).

The office PC control section 20 calculates a print cost according to the number of printed sheets indicated in the received printed sheet count information 5114 (step SR2).

After having calculated the print cost, the office PC control section 20 displays the calculated print cost and received receipt number 5113 on the office PC display section 23 in correlation to each other (step SR3).

The description of the flowchart FQ will now be continued. After the printed sheet count information 5114 and receipt number 5113 have been transmitted, the server control section 50 deletes, from the user management database 511, the user record that includes the user ID 5111 included in the received usage termination information (step SQ3).

Figure 9:
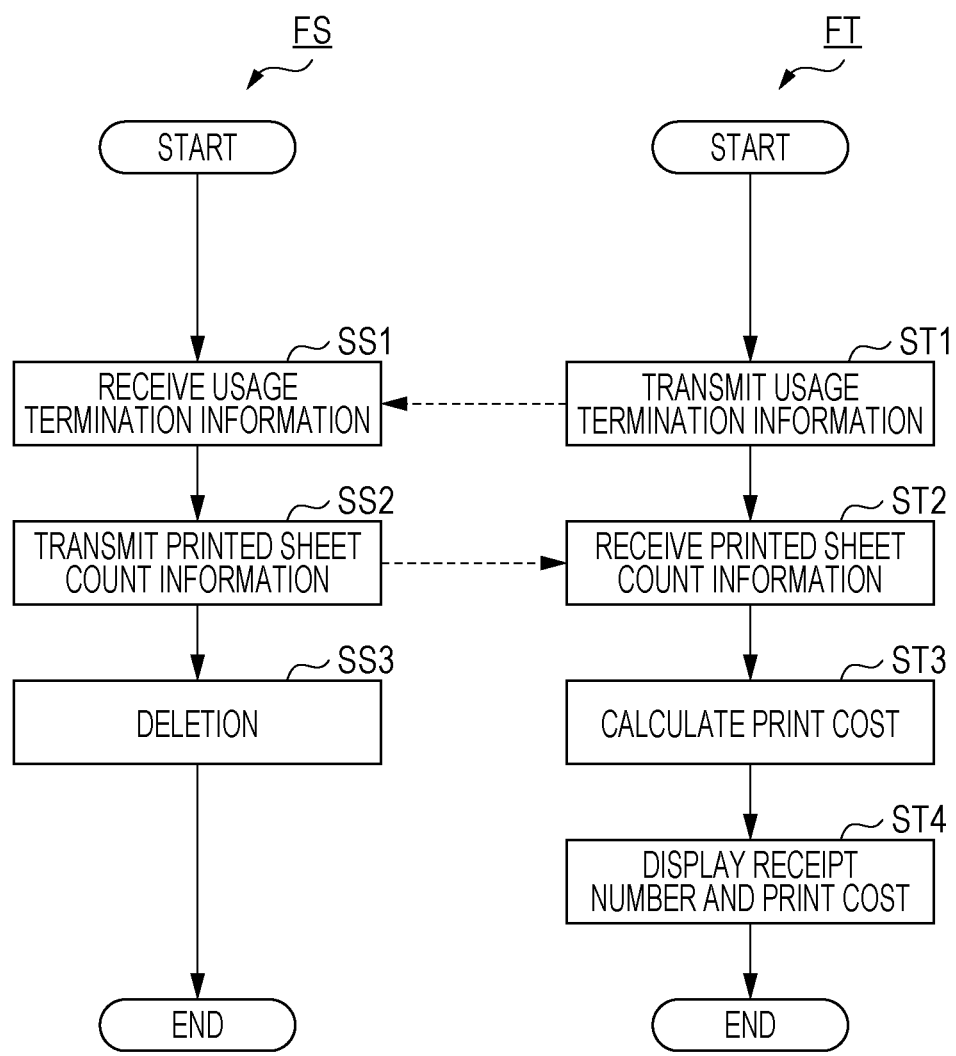
FIG. 9 also illustrates flowcharts indicating operations of the printing system.

FIG. 9 illustrates flowcharts indicating operations of the printing system 1000. Specifically, FIG. 9 illustrates the termination operation in which the office PC 2 is used to command usage termination.

In FIG. 9, the flowchart FS illustrates the operation of the server 5 and the flowchart FT illustrates the operation of the office PC 2.

When the user person P or the operator of the office PC 2 issues a usage termination command to the office PC 2, the office PC control section 20 causes the first office PC communication section 21 to transmit usage termination information indicating the termination of the use of the shared office SO to the server 5 (step ST1).

The usage termination information includes the receipt number 5113 corresponding to the usage termination command and the office ID 5112 stored in the office PC storage section 210. The receipt number 5113 is entered into the office PC 2 when the usage termination command is issued.

As illustrated in the flowchart FS, the server control section 50 in the server 5 causes the server communication section 51 to receive the usage termination information (step SS1).

The server control section 50 causes the server communication section 51 to transmit, to the office PC 2, the printed sheet count information 5114 associated, in the user management database 511, with the receipt number 5113 and office ID 5112, which are included in the received usage termination information, as a response to the usage termination information (step SS2).

As illustrated in the flowchart FT, the office PC control section 20 in the office PC 2 causes the first office PC communication section 21 to receive the printed sheet count information 5114 (step ST2).

The office PC control section 20 calculates a print cost according to the received printed sheet count information 5114 (step ST3).

After having calculated the print cost, the office PC control section 20 displays, on the office PC display section 23, the calculated print cost and the received receipt number 5113 included in the usage termination information in correlation to each other (step ST4).

The description of the flowchart FS will now be continued. After the printed sheet count information 5114 has been transmitted, the server control section 50 deletes, from the user management database 511, the user record that includes the receipt number 5113 and office ID 5112, which are included in the received usage termination information (step SS3).

Figure 10:
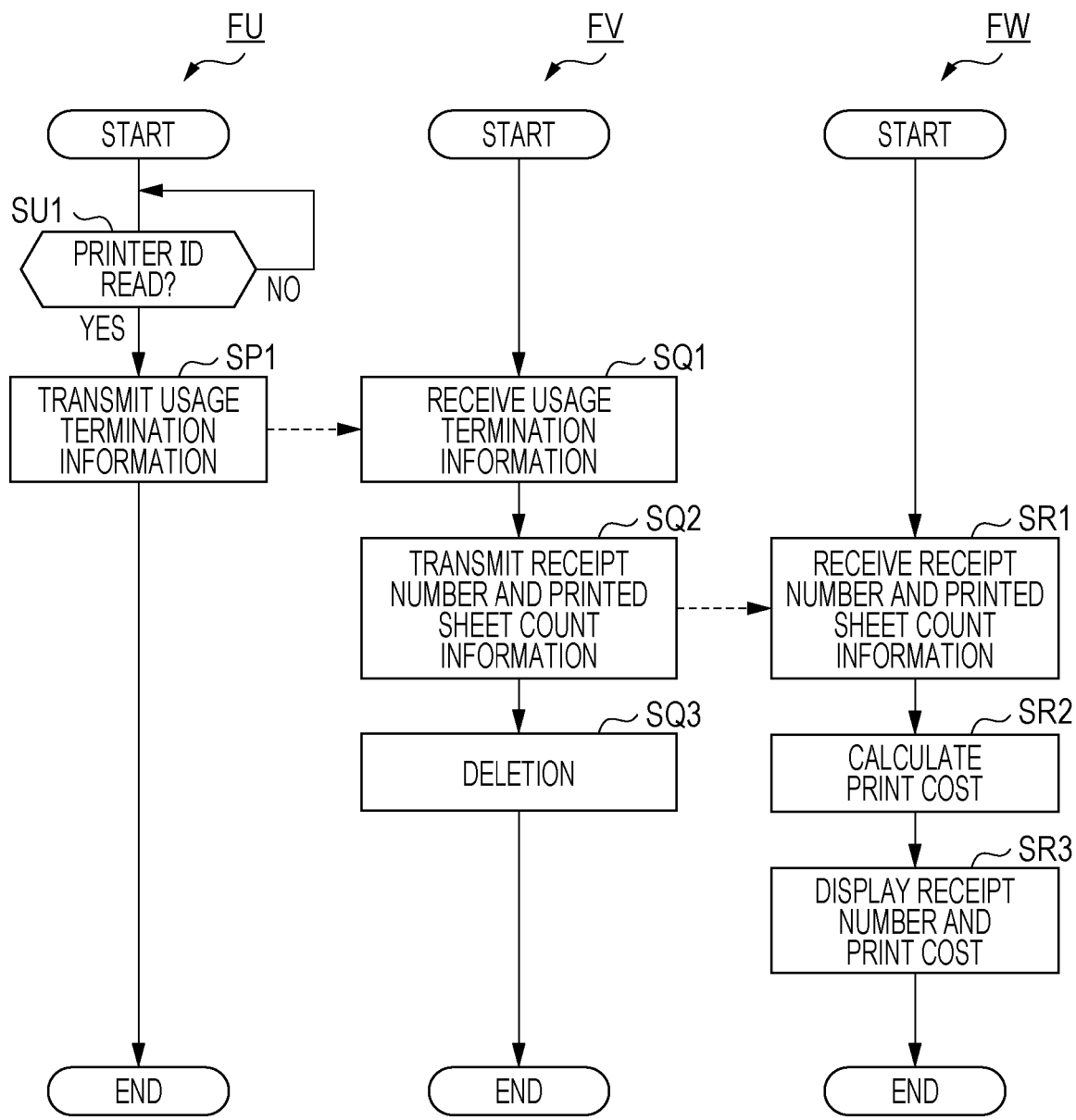
FIG. 10 also illustrates flowcharts indicating operations of the printing system.

FIG. 10 illustrates flowcharts indicating operations of the printing system 1000. Specifically, FIG. 10 illustrates a second termination operation in which the smartphone 4 is used to perform termination operation.

In FIG. 10, steps that are the same as in the flowcharts in FIG. 8 will be given the same step numbers and their detailed descriptions will be appropriately omitted.

In FIG. 10, the flowchart FU illustrates the operation of the smartphone 4, the flowchart FV illustrates the operation of the server 5, and the flowchart FW illustrates the operation of the office PC 2.

The smartphone control section 40 decides whether the printer ID 5142 has been read by the reading section 42 (step SU1).

When the smartphone control section 40 decides that the printer ID 5142 has not been read by the reading section (No in step SU1), the smartphone control section 40 executes processing in SA1 again.

When the smartphone control section 40 decides that printer ID 5142 has been read by the reading section 42 (Yes in step SU1), the smartphone control section 40 causes the smartphone communication section 41 to transmit, to the server 5, usage termination information indicating the termination of the use of the shared office SO (step SP1).

The embodiment described above provides the following effects.

A printing system 1000 has: a printer 1 to which a QR tag 6 with a printer ID 5142 recorded is attached; an office PC 2 coupled to the printer 1, the office PC 2 having an office PC driver 211; a server 5 coupled to the office PC 2 through the Internet IN; and a smartphone 4 coupled to the server 5 through the Internet IN, the smartphone 4 having a reading section 42 and a smartphone storage section 410 that stores a user ID 5111.

The reading section 42 in the smartphone 4 reads the printer ID 5142 recorded on the QR tag 6. The smartphone 4 then transmits, to the server 5, a smartphone's print command in which the read printer ID 5142 and the user ID 5111 stored in the smartphone storage section 410 are included.

The server 5 stores a print job 5132 associated with the user ID 5111, and transmits the stored print job 5132 to the office PC 2. The server 5 also transmits a server's print command that includes the printer ID 5142 included in the received smartphone's print command to the office PC 2 associated with the printer ID 5142 included in the received smartphone's print command.

The office PC 2 creates print data based on the received print job 5132 according to the received server's print command. The office PC 2 then transmits the created print data to the printer 1 associated with the printer ID 5142 included in the received server's print command.

The printer 1 performs printing according to the received print data.

Thus, the office PC 2 receives the print job 5132 from the server 5 through the Internet IN and creates print data accordingly, after which the printer 1 coupled to the office PC 2 performs printing according to the created print data. Therefore, even when the printer 1 is not coupled to the Internet IN or when an apparatus that creates the print job 5132 does not have a printer driver matching the printer 1, a system that can perform printing through the Internet IN can be constructed.

Since the above system can be constructed, the printer 1 in the existing shared office SO can be used for printing through the Internet IN, regardless of the type of the printer 1.

The server 5 stores the user ID 5111, the office PC 2 corresponding to the printer ID 5142, and the print job 5132 in advance in correlation to one another. When storing the print job 5132, the server 5 transmits the print job 5132 to the office PC 2.

In this structure, the office PC 2 can receive the print job 5132 from the server 5 before the user of the smartphone 4 commands the start of printing. This enables the printing system 1000 to quickly start printing after the user commands the start of printing.

The server 5 stores the office PC communication information 5141 to be transmitted to the office PC 2 in correlation to the printer ID 5142. Upon receipt of a smartphone's print command, the server 5 transmits a server's print command to the office PC 2 by using the office PC communication information 5141, according to the printer ID 5142 included in the smartphone's print command.

In this structure, the user of the smartphone 4 can perform printing on a desired printer 1 in a system in which printing is possible through the Internet IN.

The office PC 2 issues the receipt number 5113 that identifies the user person P of the shared office SO to the user of the smartphone 4.

In this structure, the office PC 2 or server 5 can perform various processing involved in the user person P, such as cost calculation, according to the receipt number 5113.

The smartphone 4 transmits, to the server 5, a smartphone's print command that includes the receipt number 5113 issued to the user. The server 5 transmits a server's print command that includes the received receipt number 5113 to the office PC 2. The issued receipt number 5113 has been stored in the office PC 2. The office PC 2 decides whether the stored receipt number 5113 matches the receipt number 5113 included in the received server's print command. When office PC 2 decides that there is a match between the stored receipt number 5113 and the receipt number 5113 in the received server's print command, the office PC 2 creates print data.

In this structure, when the receipt number 5113 identical to the receipt number 5113 transmitted from the smartphone 4 is stored in the office PC 2, printing is performed on the printer 1. Therefore, when the user person P is going to perform printing on the printer 1 in the shared office SO, it is possible to prevent printing from being performed according to the print job 5132 of another user person other than the user person P.

The office PC 2 calculates a print cost corresponding to the receipt number 5113. The office PC 2 also associates the calculated print cost with the receipt number 5113.

Thus, a print cost imposed on the user person P who used the shared office SO can be calculated for each predetermined period. It is also possible to appropriately notify the user person P of the print cost corresponding to the receipt number 5113.

The smartphone 4 transmits a smartphone's print command including the print job ID 5131 to the server 5. The server 5 stores the print job 5132 associated with the print job ID 5131 and user ID 5111. The server 5 adds the print job ID 5131 associated with the print job 5132 to the stored print job 5132, and then transmits the print job 5132 to the office PC 2. The server 5 also transmits, to the office PC 2, a server's print command including the print job ID 5131 included in the received smartphone's print command. The office PC 2 creates print data based on the print job 5132 identified by the print job ID 5131 included in the received server's print command.

Thus, printing is performed according to the print job 5132 identified by the print job ID 5131 transmitted from the smartphone 4. Therefore, even when the printer 1 is not coupled to the Internet IN or when an apparatus that creates the print job 5132 does not have a printer driver matching the printer 1, printing based on the print job 5132 specified by the user person P can be performed through the Internet IN.

The smartphone's print command includes specification information. The server's print command includes the specification information included in the smartphone's print command. The office PC driver execution section 201 creates print data according to the specification information included in the received server's print command.

Thus, it is possible to perform printing by the number of copies specified by the user person P and printing of a page specified by the user person P, through the Internet IN. Therefore, even when the printer 1 does not have a function for coupling to the Internet IN or when an apparatus that creates the print job 5132 does not have a printer driver matching the printer 1, it is possible to perform printing by the number of copies specified by the user person P and printing of a page specified by the user person P, through the Internet IN.

The server 5 encrypts the stored print job 5132 and transmits the resulting encrypted print job 5133 to the office PC 2. The server 5 also transmits the encryption key 5134 by which the encrypted print job 5133 is decrypted to the office PC 2 at a time different from when the server 5 transmits the encrypted print job 5133.

In this structure, the encryption key 5134 and encrypted print job 5133 are transmitted to the office PC 2 at different times, so security can be improved in communication through the Internet IN.

The server 5 is coupled through the Internet IN to the smartphone 4 and to the office PC 2 coupled to the printer 1, the office PC 2 having the office PC driver 211 matching the printer 1. The server 5 has a server storage section 510 that stores an office management database 514 in which the printer ID 5142 and office PC 2 are associated with each other and also stores the print job 5132 associated with the user ID 5111. The server 5 also has a server control section 50 that transmits the print job 5132 stored in the server storage section 510 to the office PC 2, receives a smartphone's print command including the printer ID 5142 and user ID 5111 from the smartphone 4, and transmits a server's print command including the printer ID 5142 included in the received smartphone's print command to the office PC 2 associated with the user ID 5111 included in the received smartphone's print command, the server's print command commanding printing based on the print job 5132 associated with the printer ID 5142 included in the received smartphone's print command.

Thus, effects similar to the effects of the printing system 1000 are provided.

The server control section 50 receives a smartphone's print command including the receipt number 5113 and transmits, to the office PC 2, a server's print command including the receipt number 5113 included in the smartphone's print command.

Thus, since the office PC 2 can execute processing based on the receipt number 5113, when the receipt number 5113 sent from the smartphone 4 has been stored in the office PC 2, printing is possible on the printer 1. Therefore, when the user person P of the shared office SO is going to perform printing on the printer 1, it is possible to prevent printing from being performed according to the print job 5132 of another user person other than the user person P.

The office PC 2 is coupled to the printer 1 and is also coupled to the server 5 through the Internet IN. The office PC 2 has an office PC control section 20 that receives the print job 5132 from the server 5, operates the office PC driver 211 to create print data according to the received print job 5132, and upon receipt from the server 5 of a server's print command including the printer ID 5142 that identifies the printer 1, transmits the created print data to the printer 1.

Thus, effects similar to the effects of the printing system 1000 and server 5 are provided.

The office PC 2 has an office PC storage section 210 that stores the receipt number 5113. Upon receipt of a server's print command from the server 5, the office PC control section 20 decides whether the receipt number 5113 stored in the office PC storage section 210 matches the receipt number 5113 included in the server's print command. When the office PC control section 20 decides that there is a match between the stored receipt number 5113 and the receipt number 5113 in the received server's print command, the office PC control section 20 creates print data.

Thus, when the receipt number 5113 transmitted from the server 5 is found in the office PC 2, printing is performed on the printer 1. Therefore, when the user person P of the shared office SO is going to perform printing on the printer 1, it is possible to prevent printing from being performed according to the print job 5132 of another user person other than the user person P.

Next, another embodiment will be described.

In the embodiment described above, the server 5 has transmitted the print job 5132 to the office PC 2 as the encrypted print job 5133 before the smartphone 4 transmits a smartphone's print command to the server 5. Upon receipt of a smartphone's print command from the smartphone 4, the server 5 has transmitted the print job 5132 to the office PC 2.

Operations of the printing system 1000 will be described.

Specifically, operations of the printing system 1000 when the user person P commands execution of printing on the user's PC 3 will be described.

Figure 11:
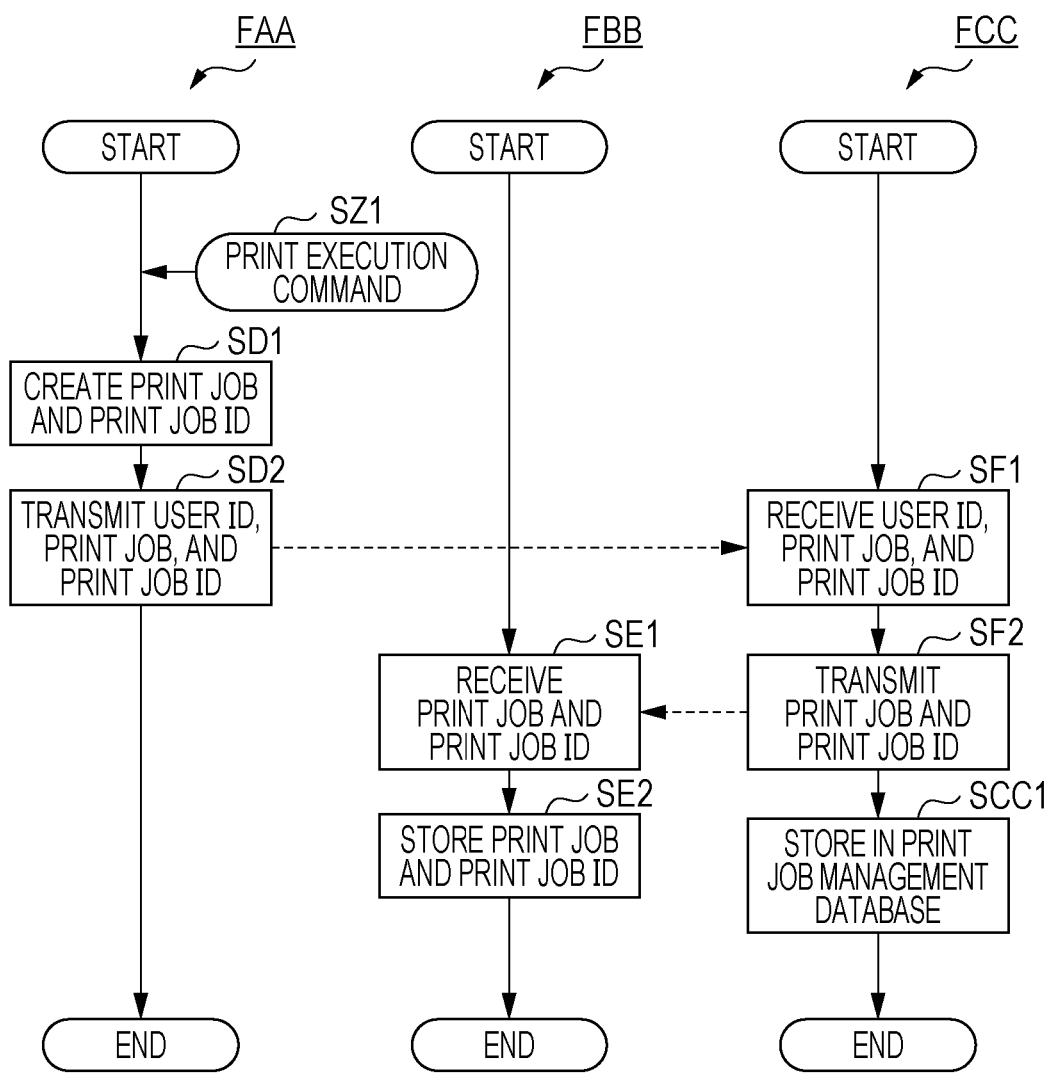
FIG. 11 also illustrates flowcharts indicating operations of the printing system.

FIG. 11 illustrates flowcharts indicating operations of the printing system 1000. In FIG. 11, the flowchart FAA illustrates the operation of the user's PC 3, the flowchart FBB illustrates the operation of the smartphone 4, and the flowchart FCC illustrates the operation of the server 5.

In FIG. 11, steps that are the same as in the flowcharts in FIG. 5 will be given the same step numbers and their detailed descriptions will be appropriately omitted.

The server control section 50 executes processing in step SF2, after which the server control section 50 creates a job record including the user ID 5111, print job ID 5131, and print job 5132, which have been received in step SF1, and stores the created job record in the print job management database 513 (step SCC1).

Operations of the printing system 1000 will be described in which after a job record has been stored, the smartphone 4 commands printing based on the print job 5132 transmitted from the user's PC 3 to the server 5.

In the print operation, a case in which the smartphone 4 transmits the receipt number 5113 and a case in which the smartphone 4 does not transmit the receipt number 5113 will be described.

Figure 12:
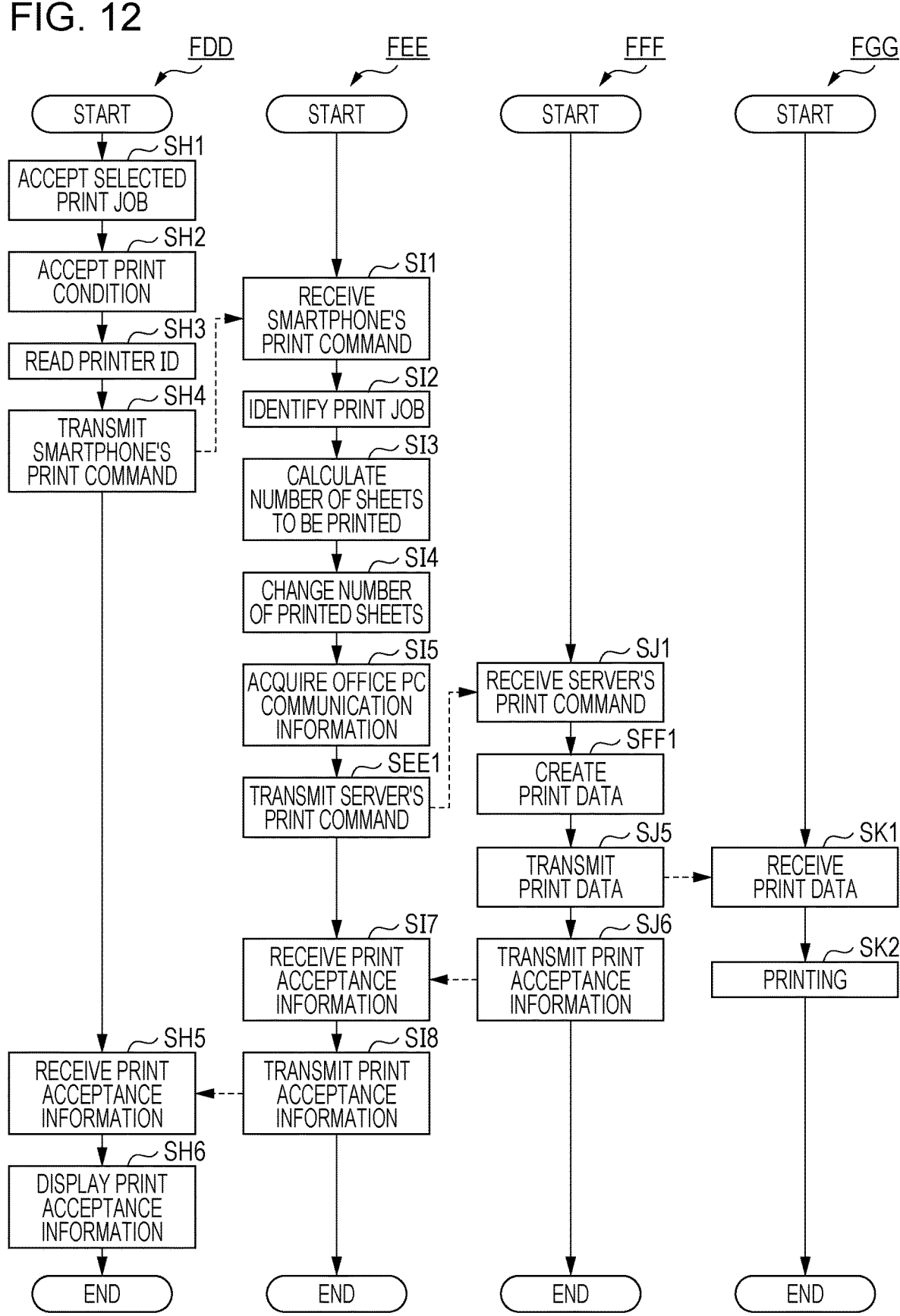
FIG. 12 also illustrates flowcharts indicating operations of the printing system.

FIG. 12 illustrates flowcharts indicating operations of the printing system 1000.

The print operation, illustrated in FIG. 12, of the printing system 1000 is performed when the smartphone 4 does not transmit the receipt number 5113.

In FIG. 12, the flowchart FDD illustrates the operation of the smartphone 4, the flowchart FEE illustrates the operation of the server 5, the flowchart FFF illustrates the operation of the office PC 2, and the flowchart FGG illustrates the operation of the printer 1.

In FIG. 12, steps that are the same as in the flowcharts in FIG. 6 will be given the same step numbers and their detailed descriptions will be appropriately omitted.

As illustrated in the flowchart FEE, the server control section 50 acquires the office PC communication information 5141 and transmits a server's print command to the office PC 2 corresponding to the acquired office PC communication information 5141 (step SEE1).

The server's print command transmitted in step SEE1 includes the printer ID 5142, the print job ID 5131, and specification information, which are included in the received smartphone's print command, as well as the print job 5132 associated with the print job ID 5131 in the print job management database 513. The print job 5132 may be replaced with the encrypted print job 5133.

As illustrated in the flowchart FFF, the office PC driver execution section 201 in the office PC 2 receives the server's print command and creates print data according to the print job 5132 and specification information, which are included in the server's print command (step SFF1).

Figure 13:
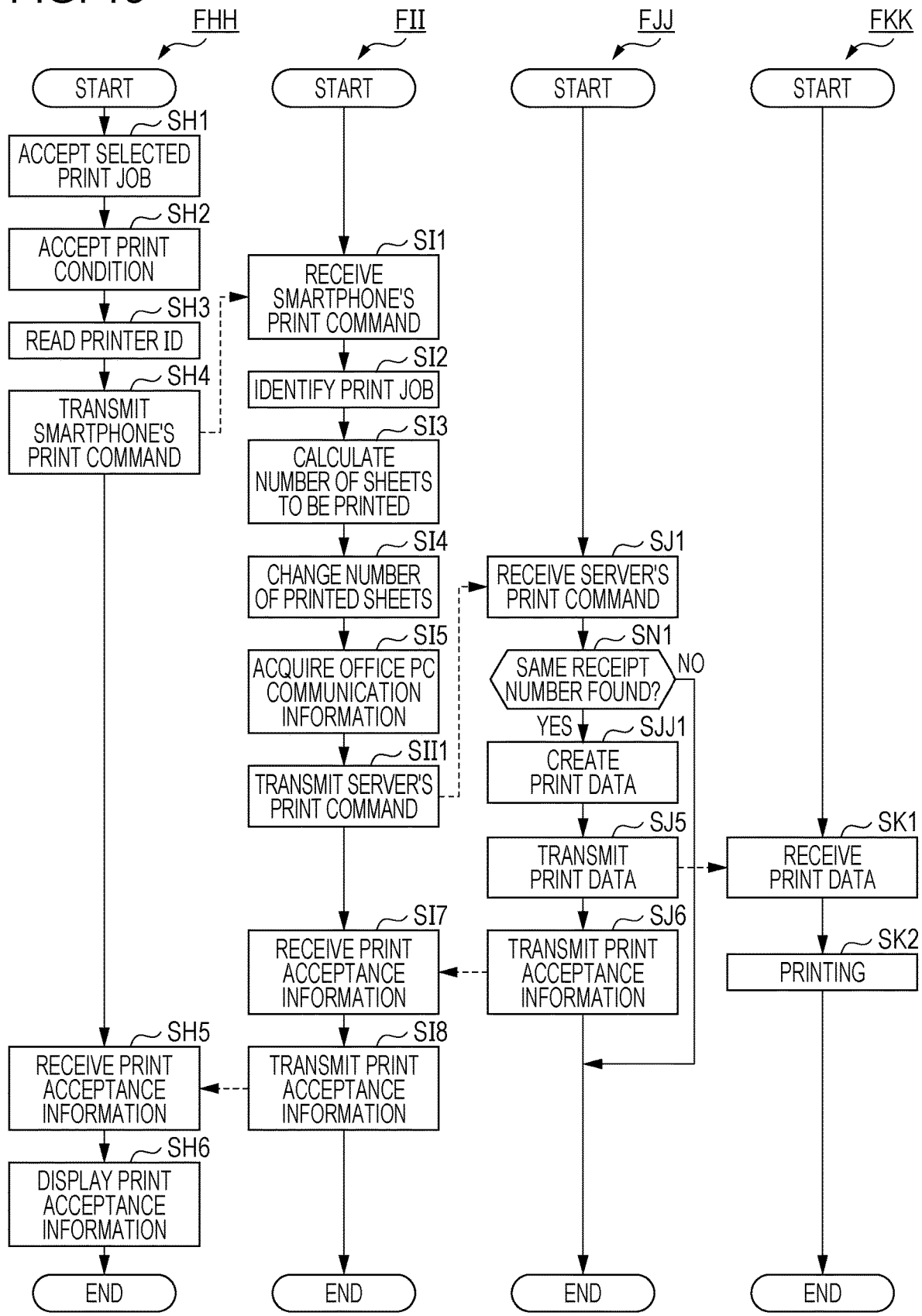
FIG. 13 also illustrates flowcharts indicating operations of the printing system.

FIG. 13 illustrates flowcharts indicating operations of the printing system 1000.

The operations of the printing system 1000 in FIG. 13 are executed when the smartphone 4 transmits the receipt number 5113.

In FIG. 13, the flowchart FHH illustrates the operation of the smartphone 4, the flowchart FII illustrates the operation of the server 5, the flowchart FJJ illustrates the operation of the office PC 2, and the flowchart FKK illustrates the operation of the printer 1.

In FIG. 13, steps that are the same as in the flowcharts in FIG. 7 will be given the same step numbers and their detailed descriptions will be appropriately omitted.

The server control section 50 causes the server communication section 51 to transmit a server's print command to the office PC 2 corresponding to the identified office PC communication information 5141 (step SII1).

The server's print command transmitted in step SII1 includes: the printer ID 5142, print job ID 5131, and specification information, which are included in the received smartphone's print command; the print job 5132 associated with the print job ID 5131 in the print job management database 513; and the receipt number 5113 included in the received smartphone's print command.

When the office PC driver execution section 201 decides that the receipt number 5113 included in the received server's print command is found in the office PC storage section 210 (Yes in step SN2), the office PC driver execution section 201 creates print data according to the print job 5132 and specification information, which are included in the server's print command (step SJJ1).

In the other embodiment, effects similar to the effects in the above embodiment are provided.

The embodiments described above just indicate one aspect of the present disclosure. These embodiments can be arbitrarily modified and applied.

In the embodiments described above, when the server 5 receives the print job 5132, the server 5 transmits the received print job 5132 to the smartphone 4. However, the destination to which the server 5 transmits the print job 5132 is not limited to the smartphone 4. Another terminal other than the smartphone 4, such as a tablet PC used by the user person P, may also be used as the destination. In this case, terminal communication information, for the other terminal, to be transmitted to the other terminal is included in one record in the terminal management database 512. The print application 411 is installed in the other terminal.

The printer 1 may have a scan function, a facsimile function, and other functions other than the print function.

The functions of the printer control section 10, office PC control section 20, user's PC control section 30, smartphone control section 40, and server control section 50 may be implemented by a plurality of processors or a semiconductor chip.

The sections illustrated in FIGS. 2A and 2B are just an example. There is no particular limitation on these sections. Hardware does not necessarily need to be individually mounted in correspondence with each section. Of course, one processor may execute programs to implement the functions of individual sections. Part of the functions implemented by software may be implemented by hardware. Alternatively, part of the functions implemented by hardware may be implemented by software. In addition, specific details of the structures of other sections in the apparatuses in the printing system 1000 can be arbitrarily modified.

The flowcharts in FIGS. 4 to 13 are divided into operation steps according to main processing, so as to facilitate the understanding of the operation of each apparatus in the printing system 1000. The present disclosure is not limited by the method of dividing a single piece of processing into steps or by names. The flowcharts may be divided into more steps according to the processing. One step may be further divided so as to include more processing. The sequence of steps may be appropriately changed.

What is claimed is:

1. A printing system comprising:
a printing apparatus;
a print control apparatus coupled to the printing apparatus, the print control apparatus having a printer driver that creates print data;
a server coupled to the print control apparatus through an Internet; and
a terminal apparatus coupled to the server through the Internet, the terminal apparatus having a reading section and a storage section storing first identification information; wherein
a medium on which second identification information that identifies the printing apparatus is recorded is attached to the printing apparatus,
the terminal apparatus
causes the reading section to read the second identification information recorded on the medium, and
transmits, to the server, a first print command that includes the read second identification information and the first identification information stored in the storage section,
the server
stores a print job in correlation to the first identification information,
transmits the print job to the print control apparatus,
receives the first print command, and
transmits, to the print control apparatus, a second print command that includes the second identification information according to the received first print command, the second print command commanding printing based on the print job,
the print control apparatus
upon receipt of the second print command, causes the printer driver to create the print data based on the print job, and
transmits the created print data to the printing apparatus corresponding to the second identification information included in the received second print command, and
the printing apparatus performs printing according to the received print data, wherein
the server
stores the first identification information, the print control apparatus corresponding to the second identification information, and the print job in advance so as to be mutually associated, and
transmits, when storing the print job, the print job to the print control apparatus.

2. The printing system according to claim 1, wherein
the server
stores print control apparatus communication information to be transmitted to the print control apparatus in correlation to the second identification information, and
upon receipt of the first print command, transmits the second print command to the print control apparatus by using the print control apparatus communication information, according to the second identification information included in the first print command.

3. The printing system according to claim 1, wherein the print control apparatus issues, to a user of the terminal apparatus, a number that identifies a user person who uses a place in which the printing apparatus is disposed.

4. The printing system according to claim 3, wherein:
the first print command includes the number;
upon receipt of the first print command that includes the number, the server adds the number to the second print command and transmits, to the print control apparatus, the second print command to which the number is added; and
the print control apparatus
decides whether the number included in the second print command was stored, and
upon deciding that the number was stored, creates the print data.

5. The printing system according to claim 3, wherein the print control apparatus
calculates a print cost involved in printing based on the print job, and
associates the calculated print cost with the number.

6. The printing system according to claim 1, wherein:
the terminal apparatus
accepts a print condition entered by an operation performed by the user, and
creates specification information that specifies the print condition and adds the specification information to the first print command;
when the specification information is included in the received first print command, the server adds the specification information to the second print command; and
when the specification information is included in the second print command, the print control apparatus creates the print data according to the specification information.

7. The printing system according to claim 1, wherein the server
encrypts the stored print job,
transmits an encrypted print job obtained by encrypting the stored print job to the print control apparatus, and
transmits an encryption key by which the encrypted print job is decrypted to the print control apparatus at a time different from when the server transmits the encrypted print job.

8. A server coupled through an Internet to a terminal apparatus and to a print control apparatus coupled to a printing apparatus, the print control apparatus having a printer driver matching the printing apparatus, the server comprising:
a server storage section that stores a print job associated with first identification information and also stores management information in which the print control apparatus and second identification information that identifies the printing apparatus are mutually associated; and
a server control section; wherein
the server control section
transmits the print job to the print control apparatus,
receives, from the terminal apparatus, a first print command that includes the first identification information and the second identification information, and upon receipt of the first print command, transmits, to the print control apparatus associated with the second identification information, a second print command that includes the second identification information, the second print command commanding printing based on the print job.

9. The server according to claim 8, wherein the server control section
receives the first print command that includes a number that identifies a user person who uses a place in which the printing apparatus is disposed, and
adds the number to the second print command and transmits, to the print control apparatus, the second print command to which the number is added.

10. The server according to claim 8, wherein:
the first print command includes specification information that specifies a print condition; and
when the specification information is included in the received first print command, the server adds the specification information to the second print command.

11. The server according to claim 8, wherein the server encrypts the print job,
transmits an encrypted print job obtained by encrypting the print job to the print control apparatus instead of the print job, and
transmits an encryption key by which the encrypted print job is decrypted to the print control apparatus at a time different from when the server transmits the encrypted print job.

12. A print control apparatus coupled to a printing apparatus and also coupled to a server through an Internet, the print control apparatus comprising a print control apparatus control section that
receives a print job from the server and operates a printer driver to create print data according to the print job, and
upon receipt from the server of a second print command that includes second identification information that identifies the printing apparatus, transmits the created print data to the printing apparatus, the print control apparatus further comprising a print control apparatus storage section that stores a number that identifies a user person who uses a place in which the printing apparatus is disposed, wherein
when the print control apparatus control section receives the second print command from the server, the print control apparatus control section
decides whether the number stored in the print control apparatus storage section is included in the second print command, and when deciding that the number is included, creates the print data.

13. The print control apparatus according to claim 12, wherein the print control apparatus control section
calculates a print cost involved in printing based on the print job, and
associates the calculated print cost with the number.

14. A print control apparatus coupled to a printing apparatus and also coupled to a server through an Internet, the print control apparatus comprising a print control apparatus control section that
receives a print job from the server and operates a printer driver to create print data according to the print job, and
upon receipt from the server of a second print command that includes second identification information that identifies the printing apparatus, transmits the created print data to the printing apparatus
wherein:
the second print command includes specification information that specifies a print condition; and
when the specification information is included in the second print command, the print control apparatus creates the print data according to the specification information.

15. A print control apparatus coupled to a printing apparatus and also coupled to a server through an Internet, the print control apparatus comprising a print control apparatus control section that
receives a print job from the server and operates a printer driver to create print data according to the print job, and
upon receipt from the server of a second print command that includes second identification information that identifies the printing apparatus, transmits the created print data to the printing apparatus, wherein:
the print job received from the server is an encrypted print job, which was encrypted; and
the print control apparatus receives an encryption key by which the encrypted print job is decrypted from the server at a time different from when the server transmits the encrypted print job.

* * * * *